(12) United States Patent
Aho

(10) Patent No.: US 9,902,638 B2
(45) Date of Patent: Feb. 27, 2018

(54) ACCELERATED PROCESSING

(71) Applicant: Richard Lee Aho, Marquette, MI (US)

(72) Inventor: Richard Lee Aho, Marquette, MI (US)

(*) Notice: Subject to any disclaimer, the term of this patent is extended or adjusted under 35 U.S.C. 154(b) by 273 days.

(21) Appl. No.: 14/183,197

(22) Filed: Feb. 18, 2014

(65) Prior Publication Data

US 2014/0231346 A1    Aug. 21, 2014

Related U.S. Application Data

(63) Continuation-in-part of application No. 12/500,597, filed on Jul. 10, 2009, now abandoned.

(51) Int. Cl.
| | |
|---|---|
| *C02F 11/02* | (2006.01) |
| *B09B 1/00* | (2006.01) |
| *C02F 3/26* | (2006.01) |
| *C02F 11/04* | (2006.01) |

(52) U.S. Cl.
CPC .............. *C02F 11/02* (2013.01); *B09B 1/004* (2013.01); *B09B 1/006* (2013.01); *C02F 3/26* (2013.01); *C02F 11/04* (2013.01); *Y02W 10/15* (2015.05); *Y02W 10/27* (2015.05); *Y02W 30/32* (2015.05)

(58) Field of Classification Search
CPC .. C02F 11/02; C02F 11/04; C02F 3/26; B09B 1/004; B09B 1/006; Y02W 30/32; Y02W 10/27; Y02W 10/15
USPC ............... 210/602, 603, 605, 621, 622, 630
See application file for complete search history.

(56) References Cited

U.S. PATENT DOCUMENTS

| | | | | |
|---|---|---|---|---|
| 3,966,599 A | * | 6/1976 | Burkhead | C02F 3/06 210/151 |
| 4,401,569 A | * | 8/1983 | Jhaveri | B09C 1/10 166/246 |
| 5,120,160 A | * | 6/1992 | Schwengel | E21B 43/305 405/128.45 |
| 5,458,747 A | * | 10/1995 | Marks | B01D 61/42 204/515 |
| 5,855,775 A | * | 1/1999 | Kerfoot | 210/170.07 |
| 6,210,955 B1 | * | 4/2001 | Hayes | B09C 1/00 252/61 |
| 7,250,287 B2 | * | 7/2007 | Aho | 435/262 |
| 2010/0233769 A1 | * | 9/2010 | Heathcote | B01F 3/1214 435/157 |
| 2010/0317090 A1 | * | 12/2010 | Parry | 435/262 |

FOREIGN PATENT DOCUMENTS

GB         2407088 A    *    4/2005

* cited by examiner

*Primary Examiner* — Fred Prince

(57) ABSTRACT

This method improves and controls ex-situ or in-situ, aerobic or anaerobic digestion of organic materials and toxic or damaging compounds through increased control of multiple chemical and biological settings and conditions. The ability to control flow, natural processes, and biological activity, while adjusting to individual site conditions, offer many opportunities to modify results. Large quantities of modified or adjusted organisms are developed and utilized. Identification and strategic manipulation of the multiple elements of the system result in performance modifications. Energy is utilized to manipulate characteristics of a natural degradation system.

8 Claims, 11 Drawing Sheets

Biological Processing for Beneficial Use

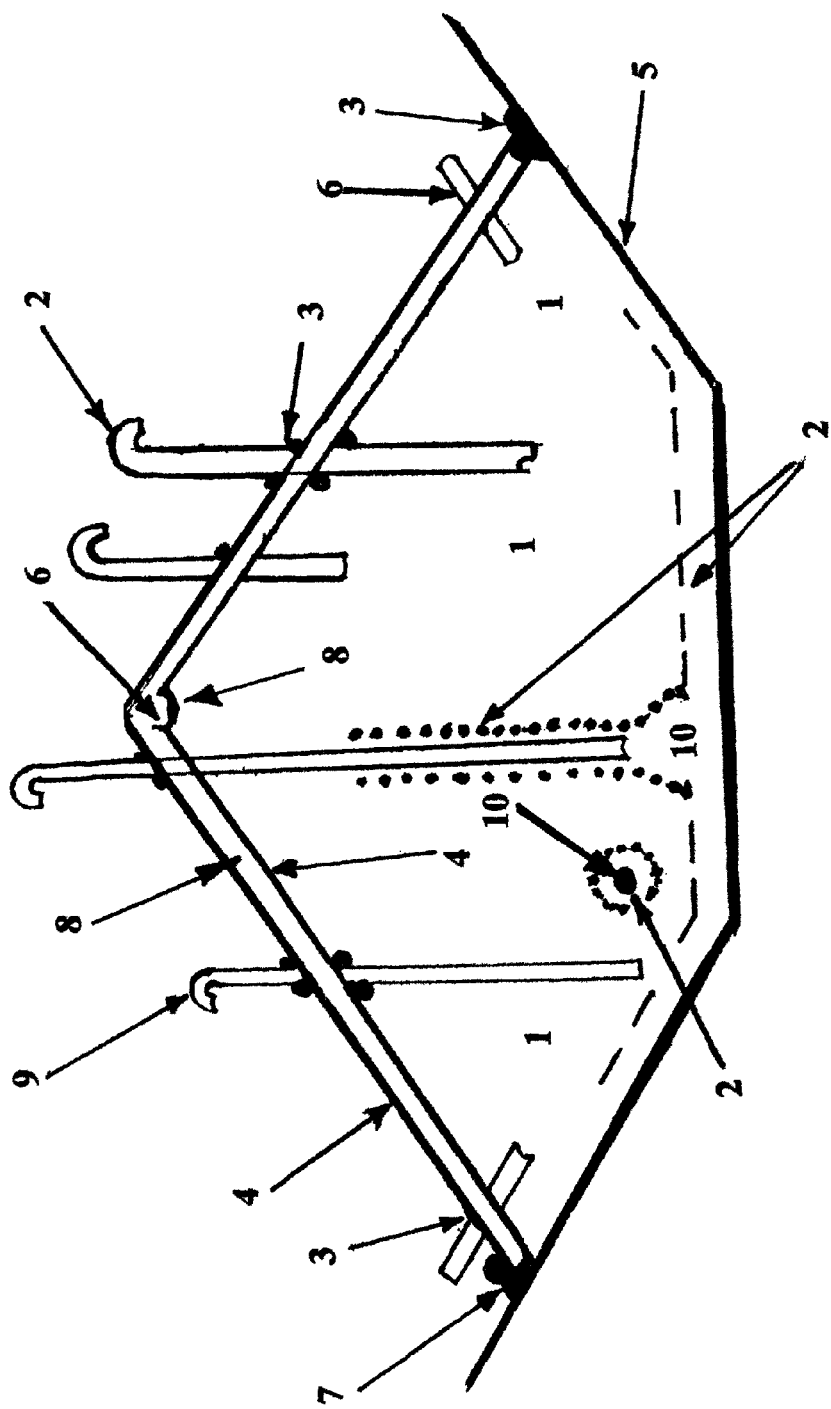
FIGURE #1
Biological Processing for Beneficial Use

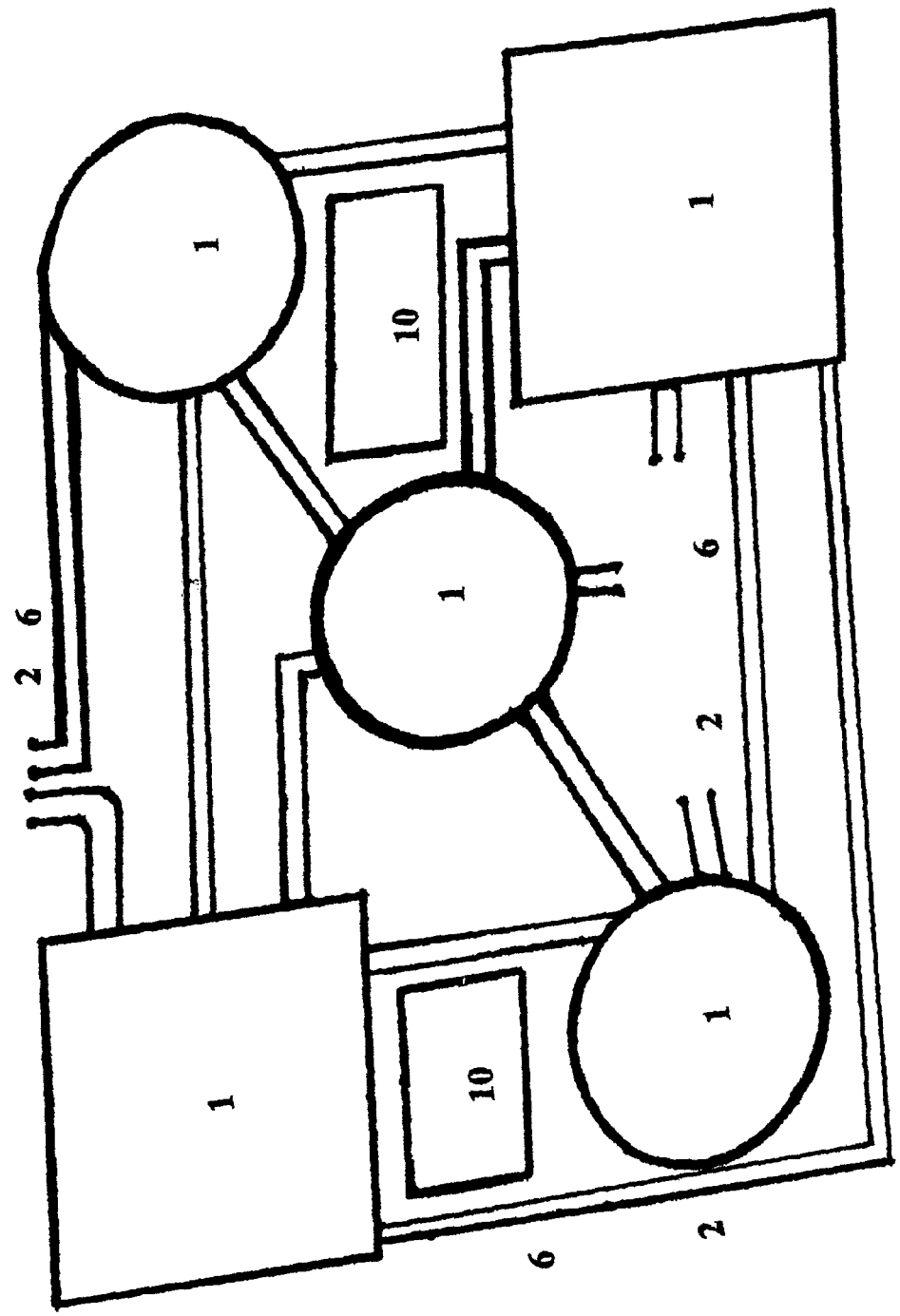

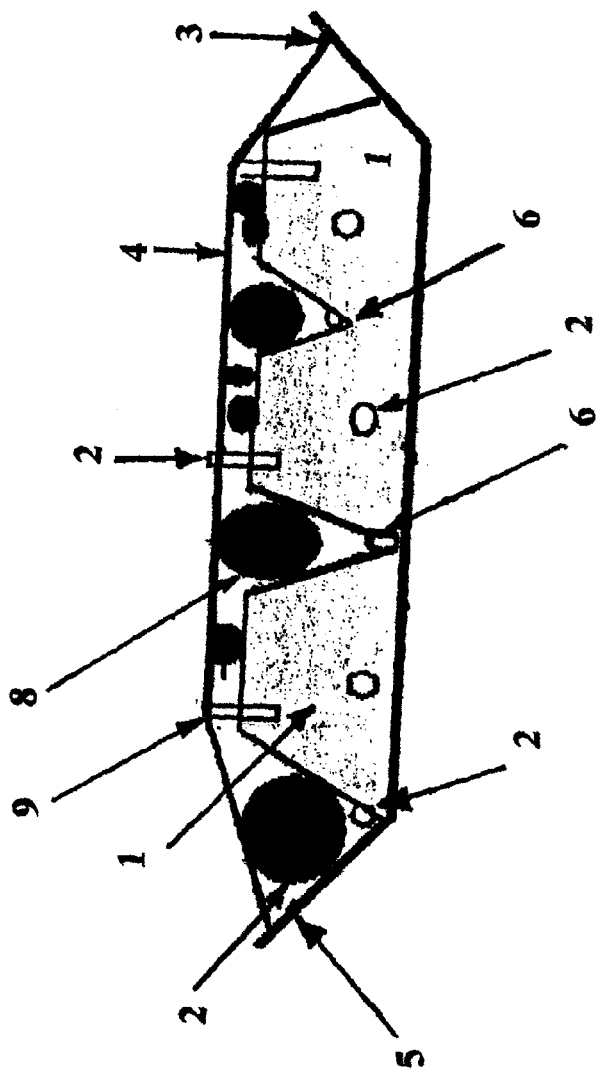
FIGURE #3
Biological Processing for Beneficial Use

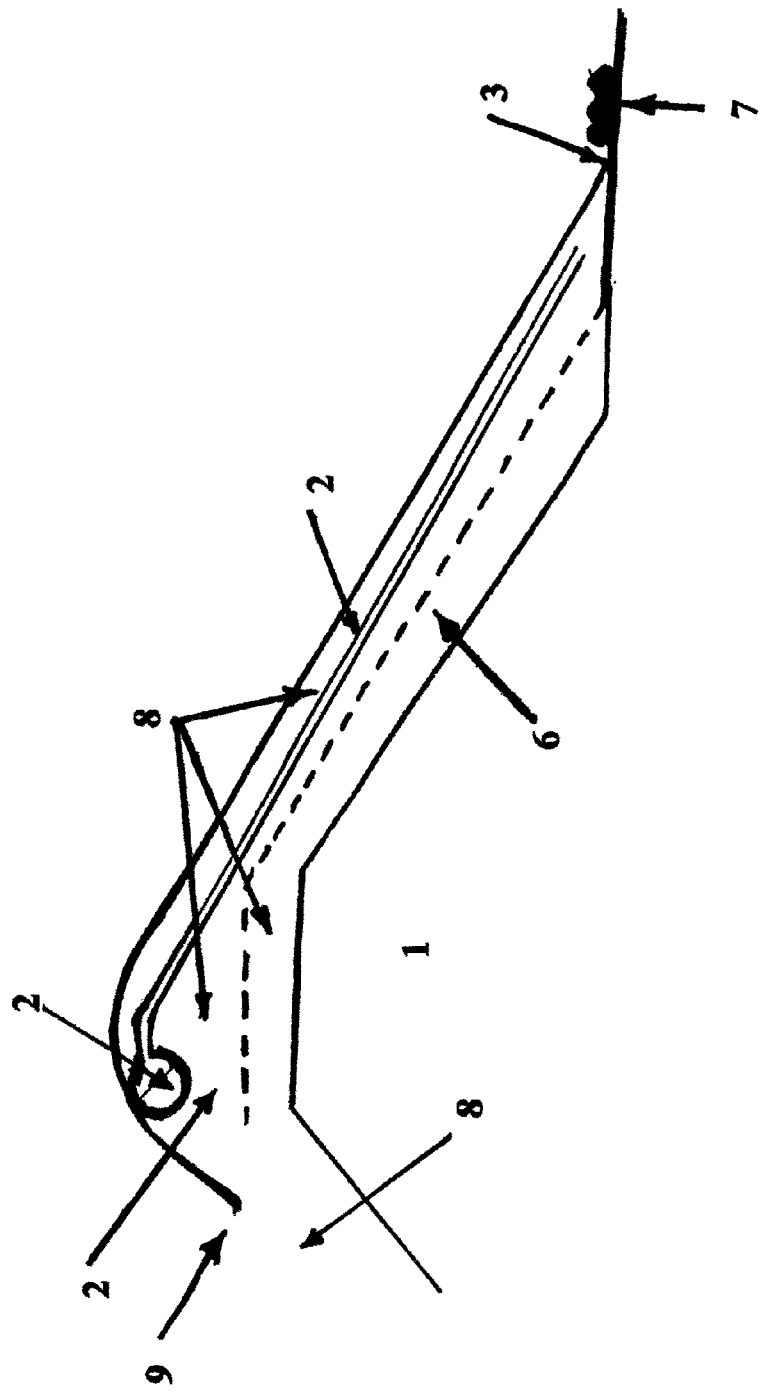
FIGURE #4
Biological Processing for Beneficial Use

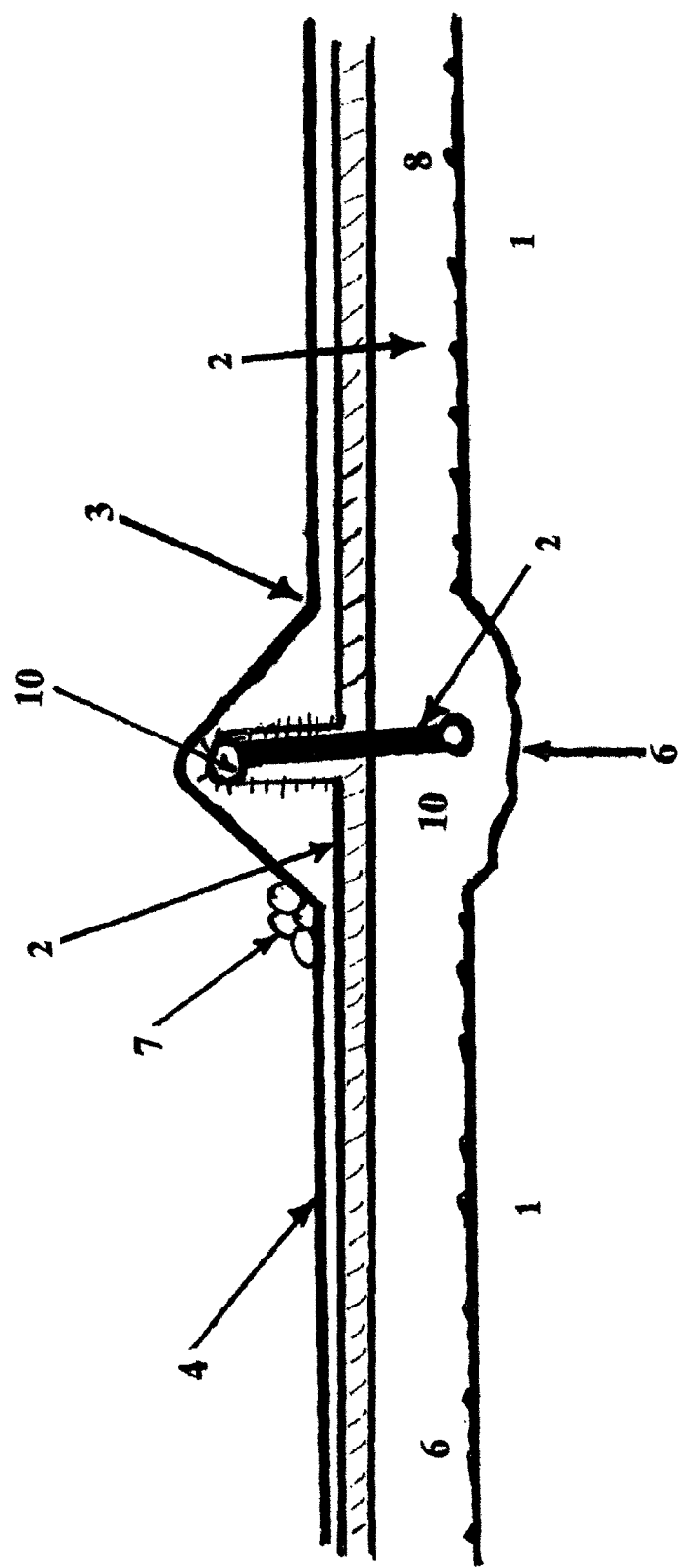
FIGURE #5
Biological Processing for Beneficial Use

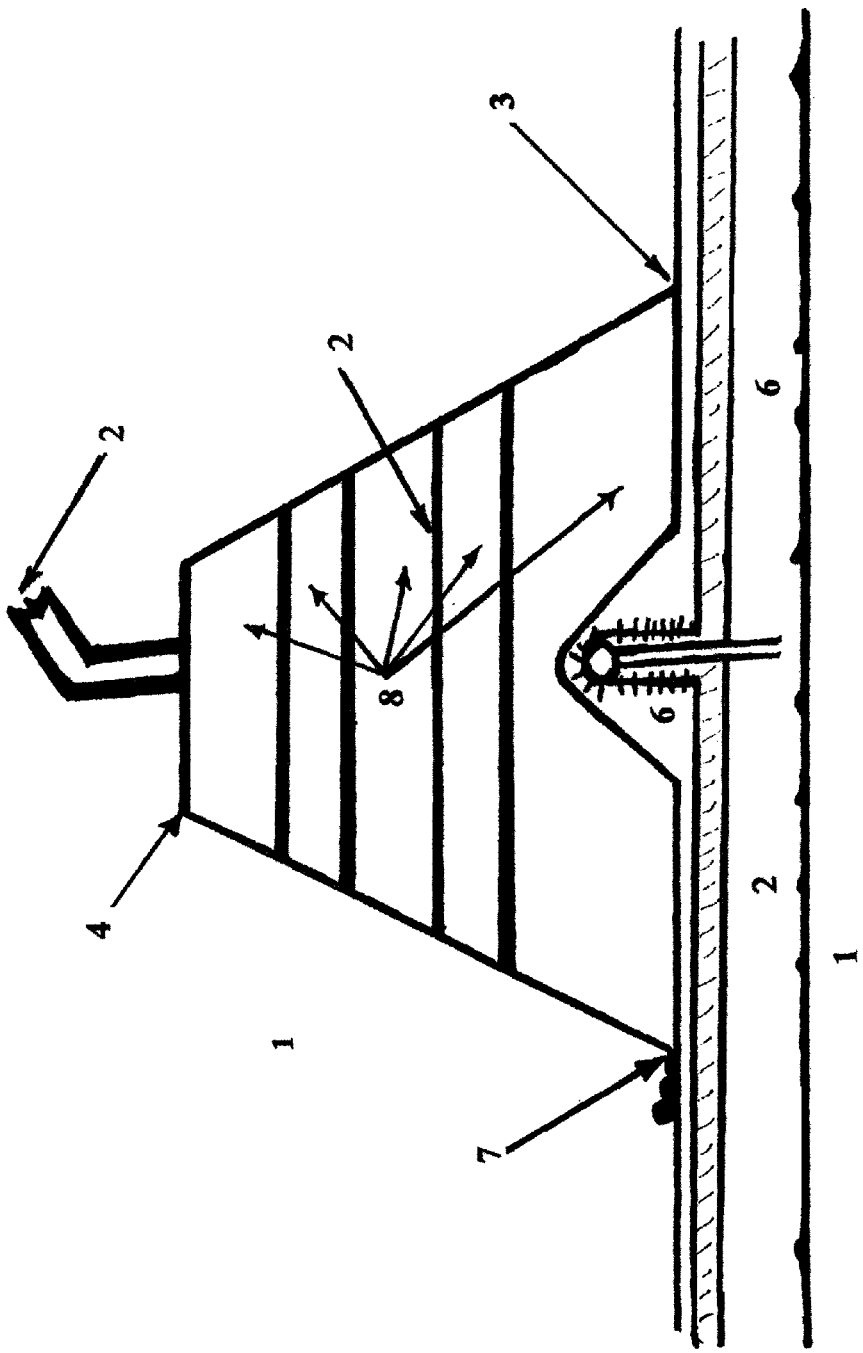
FIGURE #6
Biological Processing for Beneficial Use

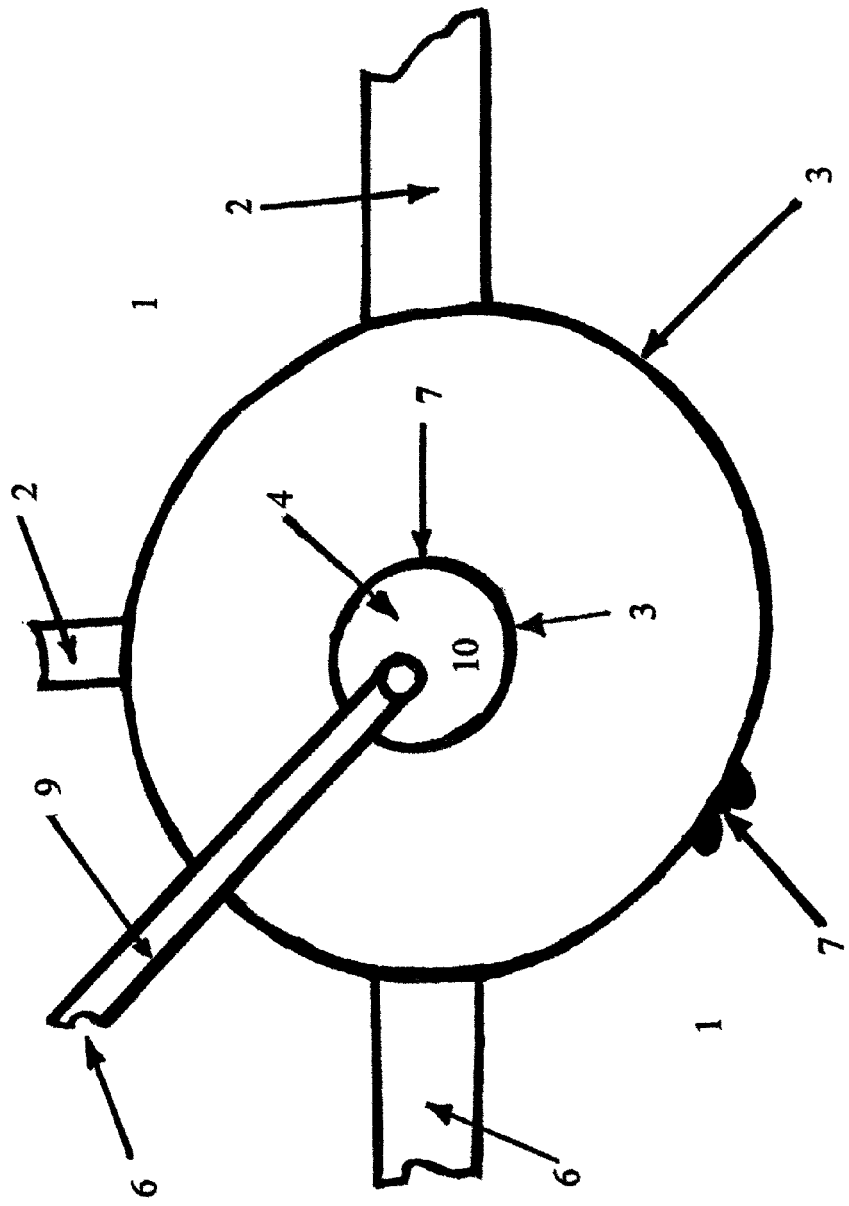
FIGURE #7
Biological Processing for Beneficial Use

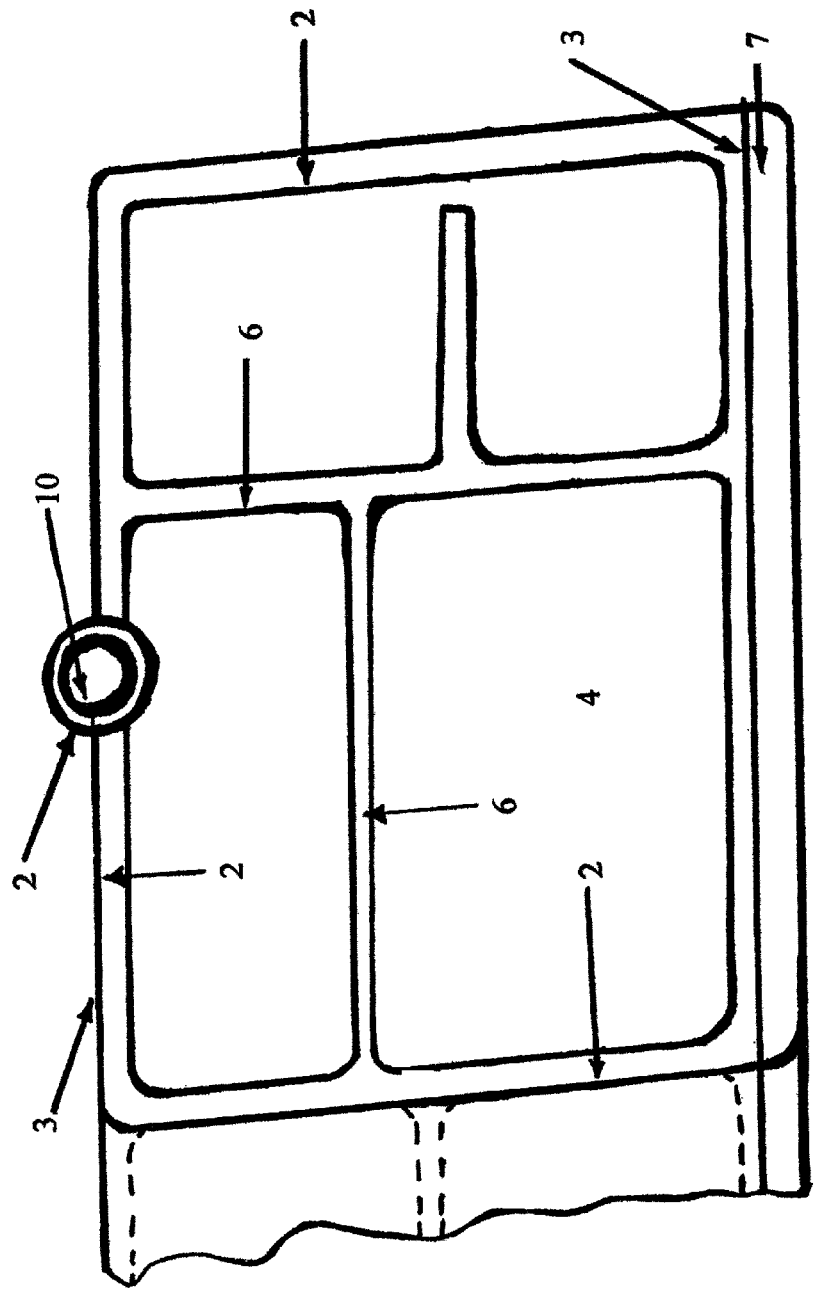

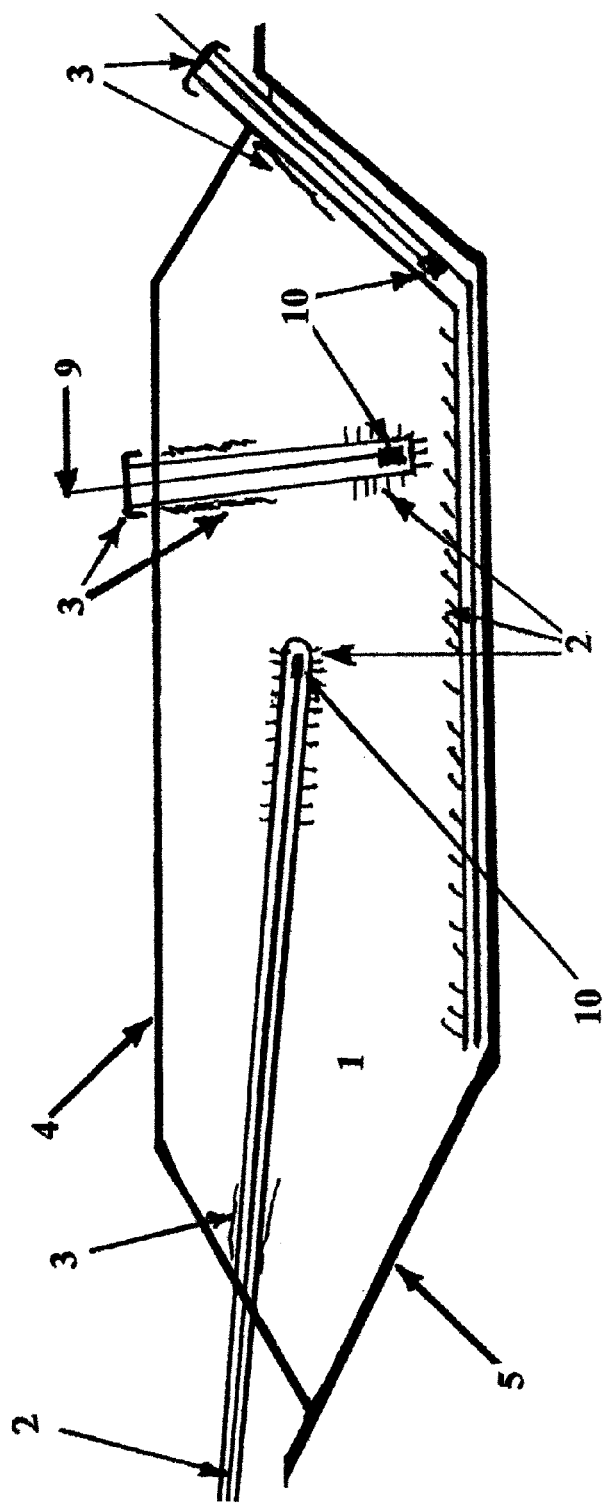
FIGURE #9
Biological Processing for Beneficial Use

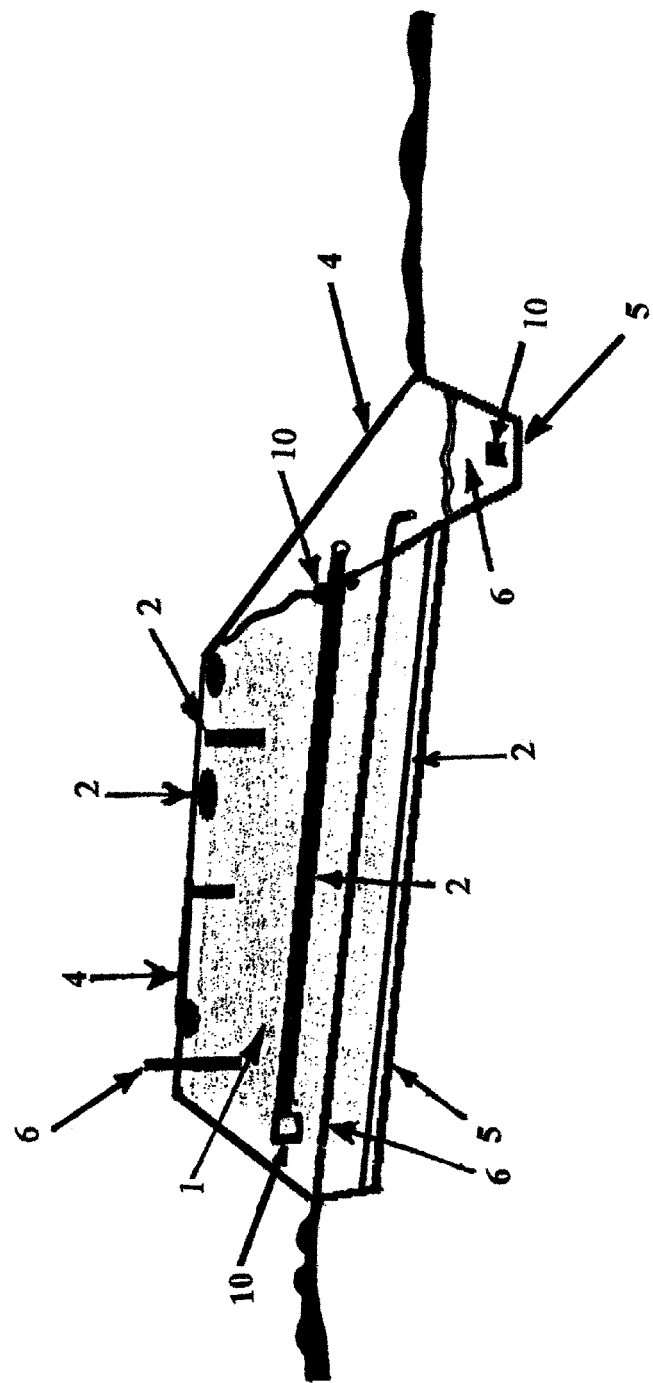
FIGURE #10
Biological Processing for Beneficial Use

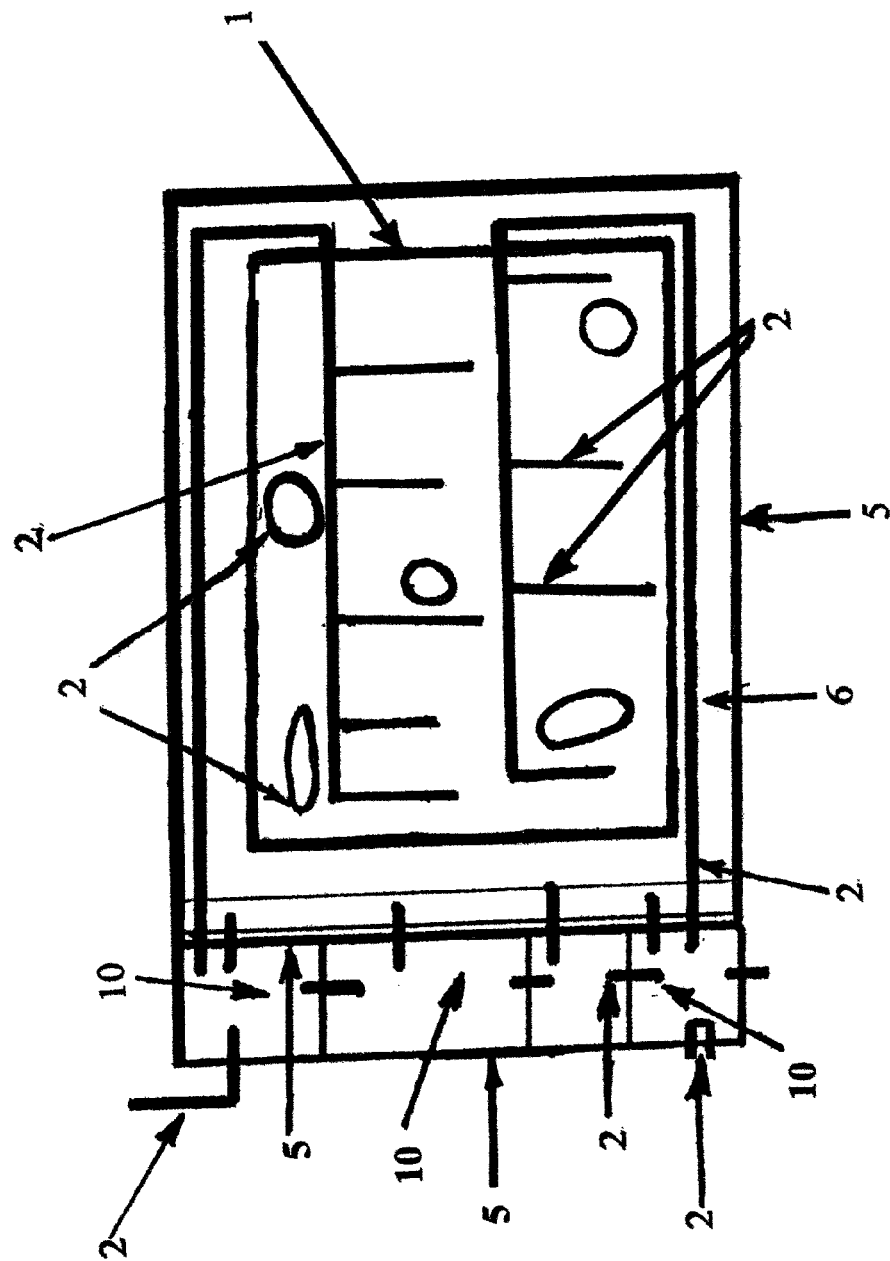
FIGURE #11
Biological Processing for Beneficial Use

ACCELERATED PROCESSING

This application is a continuation in part of application Ser. No. 12/500,597 filed Jul. 10, 2009. This application incorporates by reference U.S. Pat. No. 7,250,287 in its entirety. U.S. Pat. No. 7,250,287, "Transformer" aerobic digestion method, a system for treating biodegradable waste material through aerobic degradation. The entire document is incorporated by reference and portions of U.S. Pat. No. 7,250,287 are included in this document for ease and clarity during examination.

BACKGROUND OF THE INVENTION

Transformer Abstract Referenced

This method facilitates the cost effective treatment of liquid, hazardous, and solid waste in a landfill or composting site or any other containment facility. The ability to distribute the oxygen to the waste, facilitate aerobic degradation, and remove the spent waste are the focal points of the process. This invention can digest any size landfill or treat any size green waste pile. Waste moisture content is increased, eliminating fires and the aerobic degradation halts the production of harmful greenhouse gases and odors. Liquid is oxygen-supplemented and added to the waste to maintain aerobic degradation. Temperature increases with the availability of the dissolved and released oxygen. The bacteria break down the solids and liquid waste. The digested material is available for release, cover or agricultural uses. Facility space is recovered, odors are minimized, and environmental risk is minimized. Leachate to be discharged is isolated and treated to the needs of the facility, which can be anywhere between total treatment and pre-treatment. The isolation and use of the landfill generated biological colony makes the current invention unique as a leachate and solids treatment system.

Transformer Claims Referenced

1. An aerobic digestion method for treating biodegradable solid waste comprising: providing a liquid containment structure for holding a volume of biodegradable solid waste; providing said liquid containment structure with a liquid introduction system and a liquid collection system, said liquid introduction system including a mixing system for creating oxygen-enriched liquid; filling said liquid containment structure with a volume of biodegradable solid waste; providing a source of liquid; providing a source of air or oxygen; mixing said source liquid and said air or oxygen using said mixing system to create an oxygen-enriched liquid; introducing said oxygen-enriched liquid into said volume of solid waste using said liquid introduction system to contact said volume of solid waste so as to aerobically degrade said volume of solid waste into processed waste, wherein said mixing step is performed at the point of introduction of the oxygen-enriched liquid into the volume of solid waste and during said introducing step; and collecting any excess liquid within the volume of solid waste using said liquid collection system.

2. The method as in claim 1, wherein said source of air or oxygen is normal air, pure oxygen or a mixture of both.

3. The method as in claim 1, wherein said liquid introduction system includes surface excavations in the volume of solid waste, slotted or perforated tubes positioned in the volume of solid waste, or pockets of permeable waste in the volume of solid waste to facilitate the contact between the volume of solid waste and oxygen-enriched liquid.

7. The method as in claim 1, wherein said solid waste is municipal solid waste (MSW), green waste, or construction debris.

8. The method as in claim 1, wherein said source of liquid includes leachate, liquid industrial waste, sewage, grey water, or any other aerobically degradable liquid waste.

9. The method as in claim 1, wherein said liquid collection system includes a primary collection system provided at the bottom of the containment structure and an auxiliary collection system provided within the volume of solid waste.

10. The method as in claim 1, wherein internal flow within the volume of solid waste is controlled using permeable, semi-permeable and impermeable membranes placed within the volume of solid waste.

14. The method as in claim 1, wherein said liquid collection system is provided in liquid communication with a holding vessel, liquid contained in the holding vessel is aerated so as to biological treat the liquid therein.

Transformer Background

The "Transformer" method is the result of understanding the aerobic process and augmenting it to meet the advanced needs of our society. Current anaerobic degradation of solid waste facilities is so slow that that it is not practical to use it effectively during the useful life of most solid waste facilities. The invention described herein is cost effective because of its speed and its approach. The standard aerobic design for composting facilities requires operators to mechanically "turn" the material or to suck or blow air into the pile.

The liquid or pumpable wastes treated by the invention generally fail the U.S. EPA paint filter test and include, but are not limited to sludge, leachate, contaminated groundwater, contaminated surface water, sewage, stormwater, liquid industrial waste, process water, spoiled liquid products and mine drainage. The term definitions include, but are not limited to: Industrial waste—Waste both liquid and solid that are not hazardous waste and produced in an industrial setting. Grey water—Liquid waste from homes and restaurants that does not include human waste. Sewage—Liquid waste that contains human waste. Process waster—Water that is used in a process and contaminated such that it cannot be released into the environment without effecting the environment. Mine drainage—Liquid that is contaminated due to contact with materials in a mining environment. Leachate—Water that has come in contact with materials and has "leached" portions of said materials into solution.

In addition to hydrogen peroxide, other oxygen releasing compounds include magnesium peroxide, permanganates, calcium peroxide, and other similar compounds.

Brief Summary of the Transformer

This method of aerobic treatment is inexpensive, drastically improves environmental protection, and is practical. This is the only system in existence that can cost effectively aerobically digest the waste in a landfill. The addition of oxygen-enriched liquid to the waste feeds the internal biological colony. Because of the significant flows required to maintain the aerobic process, the use of supplemental drainage media may be required to control the process depending on the characteristics (such as size) of the individual facilities. This method solves the fundamental problem of the methods that preceded it, the effective distribution of oxygen and water in the waste pile.

The construction design and methods used in this invention facilitates the cycling of water through the system, minimizes or eliminates the possibility of leakage through the liners, minimizes or eliminates pressure on the liner, minimize or eliminate the possibility of leakage over the edge of the liners, minimize or eliminate the possibility of leachate outbreaks, and maximize the volume of waste that can be stored in the landfill or composting facility.

BRIEF SUMMARY OF THE INVENTION

This invention is an improved waste processing and remediation device. The current invention consists of a "system", comprised at the minimum, of one or more areas that are being treated, the equipment to manipulate the solids being treated or decontaminated, and the liquid (or liquid-solid) mixture that is being moved in the system. One or more liquid storage containments for the circulated liquid or circulated liquid-solid mixtures would be normally considered part of the system. These containments are not required if the microorganisms can be maintained without the containment. The liquid could be immediately aerated and put into the solids such that the microorganisms and their characteristic survive the cycle. A wide array of equipment and vessels could be attached to the system and become a component of it. The liquid carries with it whatever it picks up as it is moved in the solids.

Cycling, circulation, circulating, or flow all imply the collection and reintroduction of the "liquid". Movement or flow of the liquid with the solid results in improved processing. Forcing flow through the solid improves the speed and effectiveness of the processing of the degradable materials.

Anoxic or anaerobic are used interchangeably and imply the there is a condition that there is insufficient oxygen to support aerobic organisms.

Maintaining the carried organisms in the liquid means that the organisms and therefore their characteristic survive the cycle at a minimum. By removing live organism from the solids it is obvious that there are still live organisms in the solids.

Degradable organic would include organic materials in general, such as sludge, yard waste, the organic portion of MSW, as well as the degradable contaminants found in soils and groundwater.

With the exception of the Transformer system current processes are carried out in small containers or are crude systems with little control or intention of optimizing the internal degrading organisms. ACCELERATED PROCESSING systems further facilitate the effective addition of non-waste materials to what is normally considered waste to increase the value and effectiveness of the end product will be utilized. ACCELERATED PROCESSING is the biological processing of organic materials such that large portions of the liquid and solid materials are converted to commodities of some value. In addition to being harmless, the intent is to modify large quantities of liquids and solids such that they are highly beneficial and useful materials after processing. The flow of organisms and materials enhances exposure and treatment.

The innovative manipulation of organisms in countless numbers and the optimized or improved processing of organic materials make this invention unique. The extraction, injection, and manipulation of multiple generations of live bacteria has never been accomplished before. The scale of the invention facilitates processing at an effectiveness and speed that is not found in nature. Transfer of organism from multiple facilities and/or multiple locations within facilities produces optimized hybrid microorganisms. Unnaturally large numbers of optimized organisms, in quantities measured in millions of gallons and thousand of cubic yards offer new levels of environmental benefits and protection. Combined and sequential anaerobic and aerobic treatment, the improved energy potential of the modified anaerobic organic materials, and the ability to mix and degrade toxins makes the invention unique and patentable.

1. In addition to the features of the Transformer process, ACCELERATED PROCESSING features extraction, nurturing, injection, and cultivation of living organisms from liquid and solids by means of pumping, vacuum, siphon, pressurization, or optimization of gravity (water tower). Materials with high solids content can be digested at high rates of degradation in both anaerobic and aerobic states.

2. The use of a temporary or/and flexible containment "cap" serves to isolate the materials, induce internal flows and create an optimized processing environment. The control of oxygen content and pressures (both positive and negative) of gases, liquids, and biological activity is utilized to induce flow and vitality.

3. The use of massive quantities of liquid, solids, and gas inside the large high capacity containments systems creates optimized or improved processing of organic materials. Beneficial organisms that are manipulated, destroyed, digested, injected, extracted, circulated, bred, trained, and or moved in both aerobic and anaerobic states that optimize both the operational capability and economics of degradation of the organic materials.

4. The in-situ use of massive quantities of liquid, solids, and gas inside the large high capacity containments systems. Beneficial organisms that are manipulated, destroyed, digested, injected, extracted, circulated, bred, trained, and or moved in both aerobic and anaerobic states that optimize both the operational capability and economics of degradation of the organic materials at contaminated sites.

5. Beneficial biological mixtures are developed and produced in quantities greater than the current miniscule 200 gallons practical limit of compost brewers. The issues of consistency and quality are dramatically improved with the ability to produce uniform multimillion-gallon batches of materials that increase vitality, disease/insect resistance, and/or growth in plants.

6. With the process composting operations are retrofitted or created to minimize cost, increase efficiency, and/or improve control and processing of contaminants.

7. Sequential treatment utilizing solids, liquids, and gas in variations of anaerobic and aerobic digestion and processing optimizes treatment flexibility.

BRIEF DESCRIPTION OF DRAWINGS

FIG. 1 A cross-section of an anaerobic solids portion of an ACCELERATED PROCESSING facility is shown in (FIG. 1).

FIG. 2 The combination of aerobic organic material containments and aerobic liquid storage with anaerobic wastepiles and anaerobic liquid reservoirs greatly increases the digestive power of the treatment system.

FIGS. 3, 4, & 5 A channel in the waste is not required, but can be helpful as gas, liquids, organisms, etc. can be more easily forced to flow in or out. Perforated piping or rolled membranes, screens, or any porous material (FIG. 4 and FIG. 5) can be inserted into the mounds or layers of compost to facilitate gas migration and/or expose emissions to degrading organisms in the aerobic application.

FIG. 6 The base of the slope is sealed with soils or some other significant ballast to prevent uncontrolled migration.

FIG. 7 A conventional biofilter can be substituted for the chimney and a vacuum system can also be utilized to influence gas flow if greater control is desired.

FIG. 8 This plan view of a slope illustrates the mounding of digested organic materials and conveyance materials (such as piping) under an impermeable or partially permeable membrane.

FIG. 9 A waste pile that is being used to grow organism while digesting solids and cleaning liquids can also be utilized to mix and dilute materials that would be too toxic to treat otherwise.

FIG. 10 Illustrated flow induction and the use of extraction to accelerated the migration of liquids, organisms, solids, and/or gas in the mass.

FIG. 11 Illustrated flow induction and the use of channels to accelerated the migration of liquids, organisms, solids, and/or gas in the mass.

DETAILED DESCRIPTION OF THE INVENTION

The current invention consists of a "system", comprised at the minimum, of one or more areas that are being treated and the equipment to manipulate the solids being treated or decontaminated and the liquid (or liquid-solid) mixture that is being moved in the system. One or more liquid storage containments for the circulated liquid or circulated liquid-solid mixtures would be normally considered part of the system. A wide array of equipment and vessels could be attached to the system and become a component of it. The liquid carries with it whatever it picks up as it is moved in the solids. Cycling, circulation, circulating, or flow all imply the collection and reintroduction of the "liquid". Movement or flow of the liquid with the solid results in improved processing.

ACCELERATED PROCESSING is the preparation, mixing, cultivating, sheltering, harvesting, and manipulation of organisms and additives to process organic materials, waste, and contaminated materials into beneficial products or at least benign filler. This invention will process organic material, waste, contaminated materials, reactive materials, toxins, and greenhouse gas at efficiencies that have not been achieve before. The Transformer operated with gravity moving liquids through solids, ACCELERATED PROCESSING forces flow in and out and through the solid with force beyond gravity of the elevation change of the solid. Increasing internal flow increases the ability to process materials. The Transformer could not overcome the resistance to flow of an anaerobic system, therefore it relies on aerobic organisms. ACCELERATED PROCESSING can manipulate both anaerobic and anaerobic conditions with the use of external energy for pumps, vacuum, and other methods or devices that can apply force to liquids. Forcing anaerobic liquid through anaerobic solids and maintaining the anaerobic organisms throughout all steps of the process increases the ability of the microorganisms, increases population, and causes the microorganism to evolve. The flow or cycling of the liquid, into, within, out of, and in storage before reinsertion or removal, while maintaining anaerobic conditions, facilitates the evolution of the capabilities of the organisms.

Isolation of the organisms from oxygen is required or aerobic organisms will take over. Cycling of anaerobic liquids and the associated organisms, solids, and whatever else is moved by the liquid increases gas productions and overall speed of processing.

FIG. 1 A cross-section of an anaerobic solids portion of an ACCELERATED PROCESSING facility is shown in (FIG. 1). External vacuum/pressurization equipment can extract gas or maintain pressure from a header and feeder grid. One or more horizontal or vertical porous or hollow media will extract liquid, inject bacteria, liquids, or gas to enhance biological activity and create flow. This extraction equipment is in addition to or without the use of a conventional leachate collection system that may be found on the bottom of the containment. The surface header and feeder can be utilized in both the anaerobic and aerobic scenarios. The outer membrane is flexible and expands as gas pressure increases. The travel of liquid through the organic material optimizes aerobic degradation or anaerobic degradation and gas production depending on the application. Pumps can be located within the mass to extract liquids and organism. External pumps can pressurize one point while vacuum is applied at another to induce maximum flow. Saturated materials can be aerated and flow can be established by injecting on one side while extracting on the other. The entire saturated zone can be aerated in place without fear of fire.

FIG. 1 Detail

1 anaerobic or aerobic material: solids, gasses and liquids,

2 Injection, transmission, and/or extraction points, consisting of drainage media, channels, or piping, vertical, horizontal, or angled for liquids, gasses, slurries, solids (injection, pressurization, siphoning);

for vacuum extraction, gravity extraction, or pressure relief of liquids, gasses, slurries, within the mass or liquids or both;

3 seals (multiple) liquids or gas or both—optional with aerobic or when redundant

4 covers—impermeable or not, optional with aerobic treatment

5 liners—impermeable as required—plastic, metal, masonry, composites, etc, or any other materials or mixture of materials

6 open channels that facilitate flow—optional or in lieu of drainage media, channels, or piping

7 ballast for seal or barrier

8 Compost and other biologically active filter media—optional for processing emissions

9 monitoring pts, multiple locations

10 pumps, suction lines, vacuum ports, blowers, siphons, and/or the end of a positive or negatively pressurized line—optional with performance requirements FIG. 2 The combination of aerobic organic material containments and aerobic liquid storage with anaerobic wastepiles and anaerobic liquid reservoirs greatly increases the digestive power of the treatment system. The sequential exposure of contaminants to anaerobic and aerobic environments will degrade persistent contaminants such as chlorinated compounds, drugs, and toxins. The combination of treatments will degrade mixtures that would not be economically affected by a single treatment such as wastewater facilities. The combined system can be used to accelerate the "normal" degradation. The multi-vessel system will be used to brew large consistent batches of beneficial microbial mixtures. The organism in either a liquid or solid carrier, can be applied beneficially both on the current site as seed and treatment or to other sites as seed, treatment, fertilizer, and inoculants. Multigenerational adapted batches of organic material degrading organisms can be developed and shipped to other sites to carry out both in situ and ex situ treatment. The developing batches or continuous streams of organisms can be treated with organic material, contaminants, and/or substances similar to contaminants, to acclimate the treatment organisms and improve their ability to degrade.

FIG. 2 Detail 1 anaerobic or aerobic material: solids, gasses and liquids;
2 Injection, transmission, and/or extraction points, consisting of drainage media, channels, or piping, vertical, horizontal, or angled;
    for liquids, gasses, slurries, solids (injection, pressurization, siphoning);
    for vacuum extraction, gravity extraction, or pressure relief of liquids, gasses, slurries, within the mass or liquids or both;
3 seals (multiple) liquids or gas or both—optional with aerobic or when redundant;
4 covers—impermeable or not, optional with aerobic treatment;
5 liners—impermeable as required—plastic, metal, masonry, composites, etc, or any other materials or mixture of materials;
6 open channels that facilitate flow—optional or in lieu of drainage media, channels, or piping;
7 ballast for seal or barrier;
8 Compost and other biologically active filter media—optional for processing emissions;
9 monitoring pts, multiple locations;
10 pumps, suction lines, vacuum ports, blowers, siphons, and/or the end of a positive or negatively pressurized line—optional with performance requirements;

The combination of aerobic organic material and other solids containments (1), aerobic liquid storage (1) with anaerobic organic material and other solids containments (1), with anaerobic gas containment (1) and anaerobic liquid reservoirs (1) greatly increases the digestive power of the treatment system. The sequential movement, injection, extraction, and monitoring (2, 6, 9, 10) exposure of contaminants to anaerobic and aerobic environments will degrade persistent contaminants such as chlorinated compounds, drugs, and toxins. The combination of treatments will degrade mixtures that would not be economically affected by a single treatment such as wastewater facilities. The combined system can be used to accelerate the "normal" aerobic and anaerobic degradation. The multi-vessel system can be extracted and injected through access points (2), with mechanical forces (10) to be used to brew large consistent batches of beneficial microbial mixtures. The organism in either a liquid or solid carrier, can be applied beneficially both on the current site as seed and treatment or to other sites as seed, treatment, fertilizer, and inoculants. Multigenerational adapted batches of organic material degrading organisms can be developed and shipped to other sites to carry out both in situ and ex situ treatment. The developing batches or continuous streams of organisms can be treated with organic material, contaminants, and/or substances similar to contaminants, to acclimate the treatment organisms and improve their ability to degrade.

The mounding and piping facilitates preferential flow in and to the areas where the emission oxidizing organisms or extraction points are located. A layer of digested material can cover the entire surface of the organic materials (or part of it). These oxidizing materials can be added after gas extraction is complete.

When gas extraction is beneficial, the expansion of the flexible cap under and around the ballast on the surface serves as storage. Gas is extracted to maintain safe operating pressure. The trapped gas also assists the control of liquid in the organic materials. Gas between the organic material and the cover can be heated to maintain optimum degradation conditions.

FIGS. 3, 4, & 5 A channel in the waste is not required, but can be helpful as gas, liquids, organisms, etc. can be more easily forced to flow in or out. Vacuum extraction and surface pressurization also are more effective with more surface area and less material thickness. Compost can utilized in place of a gas destruction system. The best mode aerobic operation of the invention calls for one or more channels to be loosely filled with digested organic material that emission flow through from the organic materials. Perforated piping or rolled membranes, screens, or any porous material (FIGS. 4 and 5) can be inserted into the mounds or layers of compost to facilitate gas migration and/or expose emissions to degrading organisms in the aerobic application.

FIG. 3 Detail 1 anaerobic or aerobic material: solids, gasses and liquids;
2 Injection, transmission, and/or extraction points, consisting of drainage media, channels, or piping, vertical, horizontal, or angled;
    for liquids, gasses, slurries, solids (injection, pressurization, siphoning);
    for vacuum extraction, gravity extraction, or pressure relief of liquids, gasses, slurries, within the mass or liquids or both;
3 seals (multiple) liquids or gas or both—optional with aerobic or when redundant;
4 covers—impermeable or not, optional with aerobic treatment;
5 liners—impermeable as required—plastic, metal, masonry, composites, etc, or any other materials or mixture of materials;
6 open channels that facilitate flow—optional or in lieu of drainage media, channels, or piping;
7 ballast for seal or barrier;
8 Compost and other biologically active filter media—optional for processing emissions;
9 monitoring pts, multiple locations;
10 pumps, suction lines, vacuum ports, blowers, siphons, and/or the end of a positive or negatively pressurized line—optional with performance requirements;

A channel (3) in the solids is not required, but can be helpful as gas, liquids, organisms, (1) etc. can be more easily forced to flow in or out. Vacuum extraction (10) and surface pressurization (10) also are more effective with more surface area and less material thickness. Compost (8) can be utilized in place of a gas destruction system. The best mode aerobic operation of the invention calls for one or more channels (2) to be loosely filled with digested organic material that emission flow through from the organic materials. Perforated piping or rolled membranes, screens, or any porous material (2) can be inserted into the mounds or layers of compost (8) to facilitate gas migration and/or expose emissions to degrading organisms in the aerobic application.

FIG. 4 Detail 1 anaerobic or aerobic material: solids, gasses and liquids;

2 Injection, transmission, and/or extraction points, consisting of drainage media, channels, or piping, vertical, horizontal, or angled;
   for liquids, gasses, slurries, solids (injection, pressurization, siphoning);
   for vacuum extraction, gravity extraction, or pressure relief of liquids, gasses, slurries, within the mass or liquids or both;

3 seals (multiple) liquids or gas or both—optional with aerobic or when redundant;

4 covers—impermeable or not, optional with aerobic treatment;

5 liners—impermeable as required—plastic, metal, masonry, composites, etc, or any other materials or mixture of materials;

6 open channels that facilitate flow—optional or in lieu of drainage media, channels, or piping;

7 ballast for seal or barrier;

8 Compost and other biologically active filter media—optional for processing emissions;

9 monitoring pts, multiple locations;

10 pumps, suction lines, vacuum ports, blowers, siphons, and/or the end of a positive or negatively pressurized line—optional with performance requirements; A channel (6) in the solids (1) is not required, but can be helpful as gas, liquids, organisms, (1) etc. can be more easily forced to flow in or out under the membrane (4). Vacuum extraction (10) and surface pressurization (10) also are more effective with more surface area and less material thickness. Compost (8) can be utilized in place of a gas destruction system. Migration can be manipulated with an open depression (6) or other preferential channel. The best mode aerobic operation of the invention calls for one or more channels (2) to be loosely filled with digested organic material such that emission flow through from the organic materials. Perforated piping or rolled membranes, screens, or any porous material (2) can be inserted into the mounds or layers of compost (8) to facilitate gas migration and/or expose emissions to degrading organisms (8) in the aerobic application. Ballast (7) aids in the routing of the emissions and conditions can be monitored throughout the system (9).

FIG. 5 Detail 1 anaerobic or aerobic material: solids, gasses and liquids;

2 Injection, transmission, and/or extraction points, consisting of drainage media, channels, or piping, vertical, horizontal, or angled;
   for liquids, gasses, slurries, solids (injection, pressurization, siphoning);
   for vacuum extraction, gravity extraction, or pressure relief of liquids, gasses, slurries, within the mass or liquids or both;

3 seals (multiple) liquids or gas or both—optional with aerobic or when redundant;

4 covers—impermeable or not, optional with aerobic treatment;

5 liners—impermeable as required—plastic, metal, masonry, composites, etc, or any other materials or mixture of materials;

6 open channels that facilitate flow—optional or in lieu of drainage media, channels, or piping;

7 ballast for seal or barrier;

8 Compost and other biologically active filter media—optional for processing emissions;

9 monitoring pts, multiple locations;

10 pumps, suction lines, vacuum ports, blowers, siphons, and/or the end of a positive or negatively pressurized line—optional with performance requirements;

A channel (6) in the solids (1) is not required, but can be helpful as gas, liquids, organisms, (1) etc. can be more easily forced to flow in or out under the membrane (4). Vacuum extraction (10) and surface pressurization (10) also are more effective with more surface area and less material thickness. Compost (8) can be utilized in place of a gas destruction system. Migration can be manipulated with an open depression (6) or other preferential channel. The best mode aerobic operation of the invention calls for one or more channels (2) to be loosely filled with digested organic material such that emission flow through from the organic materials. Perforated piping or rolled membranes, screens, or any porous material (2) can be inserted into the mounds or layers of compost (8) to facilitate gas migration and/or expose emissions to degrading organisms (8) in the aerobic application. Ballast (7) aids in the routing of the emissions and conditions can be monitored throughout the system (9).

FIG. 6 The base of the slope is sealed with soils or some other significant ballast to prevent uncontrolled migration. A chimney containing emission-oxidizing material influences gas flow with convection caused by the heating of the membrane and materials. The cover will expand and contract with temperature. The slope base must be sufficiently secured to maintain control during the movements of the cap.

FIG. 6 Detail 1 anaerobic or aerobic material: solids, gasses and liquids;

2 Injection, transmission, and/or extraction points, consisting of drainage media, channels, or piping, vertical, horizontal, or angled;
   for liquids, gasses, slurries, solids (injection, pressurization, siphoning);
   for vacuum extraction, gravity extraction, or pressure relief of liquids, gasses, slurries, within the mass or liquids or both;

3 seals (multiple) liquids or gas or both—optional with aerobic or when redundant;

4 covers—impermeable or not, optional with aerobic treatment;

5 liners—impermeable as required—plastic, metal, masonry, composites, etc, or any other materials or mixture of materials;

6 open channels that facilitate flow—optional or in lieu of drainage media, channels, or piping;

7 ballast for seal or barrier;

8 Compost and other biologically active filter media—optional for processing emissions;

9 monitoring pts, multiple locations;

10 pumps, suction lines, vacuum ports, blowers, siphons, and/or the end of a positive or negatively pressurized line-optional with performance requirements;

The base of the slope is sealed (3) with soils or some other significant ballast (7) to prevent uncontrolled migration. A chimney containing emission-oxidizing material (8) influences gas flow with convection caused by the heating of the membrane (4) and materials (1). Vacuum extraction (10) and surface pressurization (10) also are more effective with more surface area and less material thickness. The cover will expand and contract with temperature. The slope base must be sufficiently secured to maintain control during the movements of the cap. Migration can be manipulated with an open depression (6) or other preferential channel. The best mode aerobic operation of the invention calls for one or more channels (2) to be loosely filled with digested organic material such that emission flow through from the organic materials. Perforated piping or rolled membranes, screens, or any porous material (2) can be inserted into the mounds or layers of compost (8) to facilitate gas migration and/or expose emissions to degrading organisms (8) in the aerobic application. Ballast (7) aids in the routing of the emissions and conditions can be monitored throughout the system (9).

FIG. 7 A conventional biofilter can be substituted for the chimney and a vacuum system can also be utilized to influence gas flow if greater control is desired. In the active anaerobic gas for energy, the extraction points are connected to a header.

FIG. 7 Detail

1 anaerobic or aerobic material: solids, gasses and liquids;

2 Injection, transmission, and/or extraction points, consisting of drainage media, channels, or piping, vertical, horizontal, or angled;
  for liquids, gasses, slurries, solids (injection, pressurization, siphoning);
  for vacuum extraction, gravity extraction, or pressure relief of liquids, gasses, slurries, within the mass or liquids or both;

3 seals (multiple) liquids or gas or both—optional with aerobic or when redundant;

4 covers—impermeable or not, optional with aerobic treatment;

5 liners—impermeable as required—plastic, metal, masonry, composites, etc, or any other materials or mixture of materials;

6 open channels that facilitate flow—optional or in lieu of drainage media, channels, or piping;

7 ballast for seal or barrier;

8 Compost and other biologically active filter media—optional for processing emissions;

9 monitoring pts, multiple locations;

10 pumps, suction lines, vacuum ports, blowers, siphons, and/or the end of a positive or negatively pressurized line-optional with performance requirements;

A conventional biofilter can be substituted for the chimney and a vacuum system (10) can also be utilized to influence gas flow if greater control is desired. In the active anaerobic gas for energy, the extraction points are connected to a header. Migration can be manipulated with an open depression (6) or other preferential channel. The best mode aerobic operation of the invention calls for one or more channels (2) to be loosely filled with digested organic material such that emission flow through from the organic materials. Perforated piping or rolled membranes, screens, or any porous material (2) can be inserted into the mounds or layers of compost (8) to facilitate gas migration and/or expose emissions to degrading organisms (8) in the aerobic application.

FIG. 8 This plan view of a slope illustrates the mounding of digested organic materials and conveyance materials (such as piping) under an impermeable or partially permeable membrane. Slopes of the organic materials are commonly between a one to three and a one to five ratio. The amount of gas being produced and the condition of the oxidizing material will dictate the arrangement. This cover is the best mode for the retrofit of existing landfills into an ACCELERATED PROCESSING facility with passive gas treatment. Conveyance materials can be perforated pipe, rolled fencing, mesh, screens, or anything else that has high permeability.

The mounding and piping facilitates preferential flow in and to the areas where the emission oxidizing organisms or extraction points are located. A layer of digested material can cover the entire surface of the organic materials (or part of it). These oxidizing materials can be added after gas extraction is complete. When gas extraction is beneficial, the expansion of the flexible cap under and around the ballast on the surface serves as storage. Gas is extracted to maintain safe operating pressure. The trapped gas also assists the control of liquid in the organic materials. Gas between the organic material and the cover can be heated to maintain optimum degradation conditions.

FIG. 8 Detail

1 anaerobic or aerobic material: solids, gasses and liquids;

2 Injection, transmission, and/or extraction points, consisting of drainage media, channels, or piping, vertical, horizontal, or angled;
  for liquids, gasses, slurries, solids (injection, pressurization, siphoning);
  for vacuum extraction, gravity extraction, or pressure relief of liquids, gasses, slurries, within the mass or liquids or both;

3 seals (multiple) liquids or gas or both—optional with aerobic or when redundant;

4 covers—impermeable or not, optional with aerobic treatment;

5 liners—impermeable as required—plastic, metal, masonry, composites, etc, or any other materials or mixture of materials;

6 open channels that facilitate flow—optional or in lieu of drainage media, channels, or piping;

7 ballast for seal or barrier;

8 Compost and other biologically active filter media—optional for processing emissions;

9 monitoring pts, multiple locations;

10 pumps, suction lines, vacuum ports, blowers, siphons, and/or the end of a positive or negatively pressurized line-optional with performance requirements;

This plan view of a slope illustrates the mounding of digested organic materials (8) and conveyance materials (such as piping) (2) (6) under an impermeable or partially permeable membrane (4). Slopes of the organic materials (8) are commonly between a one to three and a one to five ratio. The amount of gas being produced and the condition of the oxidizing material will dictate the arrangement. This cover is the best mode for the retrofit of existing landfills into an ACCELERATED PROCESSING facility with passive gas treatment. Conveyance materials can be perforated pipe, rolled fencing, mesh, screens, or anything else that has high permeability (2).

The mounding, ballasting (7), sealed edges (3), and piping (2) facilitates preferential flow in and to the areas where the emission oxidizing organisms or extraction points are located. A layer of digested material (8) can cover the entire surface of the organic materials (or part of it). These oxidizing materials can be added after gas extraction is complete. When gas extraction is beneficial, the expansion of the flexible cap (4) under and around the ballast (7) on the surface serves as storage. Gas is extracted to maintain safe operating pressure. The trapped gas also assists the control of liquid in the organic materials. Gas between the organic material (8) and the cover can be heated to maintain optimum degradation conditions.

The multi-vessel system will be used to brew large consistent batches of beneficial microbial mixtures. The organism in either a liquid or solid carrier, can be applied beneficially both on the current site as seed and treatment or to other sites as seed, treatment, fertilizer, and inoculants. Multigenerational adapted batches of organic material degrading organisms can be developed and shipped to other sites to carry out both in situ and ex situ treatment. The developing batches or continuous streams of organisms can be treated with organic material, contaminants, and/or substances similar to contaminants, to acclimate the treatment organisms and improve their ability to degrade.

FIG. 9 A waste pile that is being used to grow organism while digesting solids and cleaning liquids can also be utilized to mix and dilute materials that would be too toxic to treat otherwise. The vacuum extraction of liquid and organisms from the wastepile is an important feature of this invention. The conventional internal drainage of the organic materials should be modified to minimize the filtering of the organisms. Extraction media can be any porous media within the pile but will be referred to as piping from this point on. The piping should be sealed from outside atmosphere such the internal flow of liquid and therefore the extraction of organism is maximized. Energy efficient siphon arrangements can be achieved if sufficient elevation change is available. The use of Transformer technology in combination with anaerobic degradation is beneficial. The clogging associated with anaerobic digestion can be flushed out of the input lines and media with aerobic liquids. The use of aerobic liquid in the organic materials is a form of the Transformer process. Cleaning, flushing, and purging with aerobic liquid is an improvement of that invention and is a form of this invention. Wells and excavations into areas of optimized biological activity facilitate the extraction and reintroduction of optimized organisms. Flow of liquids, gas, organisms, nutrients, and contaminants is utilized to create treatment opportunities that are not available in any other circumstance. Sumps can be produced by drilling, digging, or burying as waste is placed. The targeted removed solid is teeming with biological activity. Leaving sumps as the material is placed is a likely a best mode application. A perforated pipe buried horizontally, is a good opportunity to extract bacteria that can be utilized to improve the breeding stock or the several other options this invention provides. Pumps or vacuum connections in sumps can quickly remove bacteria and water and transport them to whatever area is most advantageous. The removal of the liquid accelerates the flow within the containment and improves treatment capabilities.

FIG. 9 Detail

1 anaerobic or aerobic material: solids, gasses and liquids;

2 Injection, transmission, and/or extraction points, consisting of drainage media, channels, or piping, vertical, horizontal, or angled;
  for liquids, gasses, slurries, solids (injection, pressurization, siphoning);
  for vacuum extraction, gravity extraction, or pressure relief of liquids, gasses, slurries, within the mass or liquids or both;

3 seals (multiple) liquids or gas or both—optional with aerobic or when redundant;

4 covers—impermeable or not, optional with aerobic treatment;

5 liners—impermeable as required—plastic, metal, masonry, composites, etc, or any other materials or mixture of materials;

6 open channels that facilitate flow—optional or in lieu of drainage media, channels, or piping;

7 ballast for seal or barrier;

8 Compost and other biologically active filter media—optional for processing emissions;

9 monitoring pts, multiple locations;

10 pumps, suction lines, vacuum ports, blowers, siphons and/or the end of a positive or negatively pressurized line-optional with performance requirements;

A waste pile (1) that is being used to grow organism while digesting solids (1) and cleaning liquids can also be utilized to mix and dilute materials that would be too toxic to treat otherwise. The vacuum extraction (10) of liquid and organisms from the material mass (1) is an important feature of this invention. The conventional internal drainage (5) of the organic materials should be modified to minimize the filtering of the organisms. Extraction media can be any porous media within the pile (2) but will be referred to as piping (2) from this point on. The piping should be sealed from outside atmosphere such the internal flow of liquid and therefore the extraction of organism is maximized. Energy efficient siphon (10) arrangements can be achieved if sufficient elevation change is available. The use of Transformer technology in combination with anaerobic degradation is beneficial. The clogging associated with anaerobic digestion can be overcome in the input lines and media with forced (10) aerobic liquids. The use of aerobic liquid in the organic materials is a form of the Transformer process. Cleaning, flushing, and purging with aerobic liquid is an improvement of that invention and is a form of this invention. Wells and excavations (2) into areas of optimized biological activity facilitate the extraction and reintroduction of optimized organisms. Flow of liquids, gas, organisms, nutrients, and contaminants is utilized to create treatment opportunities that are not available in any other circumstance. Sealed vertical (3) sumps (2) can be produced by drilling, digging, or burying as waste is placed. The targeted removed solid is teeming with biological activity. Leaving sealed (3) sumps as the material is placed is a likely a best mode application. A perforated pipe (2) buried horizontally, is a good opportunity to extract bacteria that can be utilized to improve the breeding stock or the several other options this invention provides. Pumps or vacuum (10) connections in sumps can quickly remove bacteria and liquid and transport them to whatever area is most advantageous. The removal of the liquid accelerates the flow within the containment and improves treatment capabilities.

Wells and excavations into areas of optimized biological activity facilitate the extraction and reintroduction of optimized organisms. Flow of liquids, gas, organisms, nutrients, and contaminants is utilized to create treatment opportunities that are not available in any other circumstance.

Sumps (FIG. 9) can be produced by drilling, digging, or burying as waste is placed. The removed solid is teeming with biological activity. Leaving sumps as the material is placed is a likely a best mode application. A perforated pipe buried horizontally, is a good opportunity to extract bacteria that can be utilized to improve the breeding stock or the several other options this invention provides. Pumps or vacuum connections in sumps can quickly remove bacteria and liquid and transport them to whatever area is most advantageous. The removal of the liquid accelerates the flow within the containment and improves treatment capabilities.

A typical application is one or more landfills (or any other organic materials) being treated with aerated liquid as described by the Transformer process. Powered extraction and forced flow are innovations of this invention that produces an array of opportunities. One or more liquid containment vessels are utilized to enhance biological activity and facilitate the reintroduction of the enhanced liquid and bacteria. Organisms are extracted, manipulated, and utilized in one of more locations, characterizing a major improvement of existing technology. Movement of the organism is critical to effectiveness; dead organisms are of little value. The anaerobic portion of the invention provides a synergistic improvement in overall treatment capability, producing more degradation in toxic material, in less time. Treatment capabilities are expanded exponentially; environmental protection and remediation capabilities of our civilization are significantly expanded.

FIG. 10 Illustrated flow induction and the use of extraction to accelerated the migration of liquids, organisms, solids, and/or gas in the mass. In addition to the preferred use of gravity the powered movements of the elements of the mixture maximize exposure and treatment. The pump in the reservoir moves liquids and organisms back to the materials.

FIG. 10 Details 1 anaerobic or aerobic material: solids, gasses and liquids;
2 Injection, transmission, and/or extraction points, consisting of drainage media, channels, or piping, vertical, horizontal, or angled;
  for liquids, gasses, slurries, solids (injection, pressurization, siphoning);
  for vacuum extraction, gravity extraction, or pressure relief of liquids, gasses, slurries, within the mass or liquids or both;
3 seals (multiple) liquids or gas or both—optional with aerobic or when redundant;
4 covers—impermeable or not, optional with aerobic treatment;
5 liners—impermeable as required—plastic, metal, masonry, composites, etc, or any other materials or mixture of materials;
6 open channels that facilitate flow—optional or in lieu of drainage media, channels, or piping;
7 ballast for seal or barrier;
8 Compost and other biologically active filter media—optional for processing emissions;
9 monitoring pts, multiple locations;
10 pumps, suction lines, vacuum ports, blowers, siphons, and/or the end of a positive or negatively pressurized line-optional with performance requirements;

Illustrated flow induction and the use of extraction to accelerate the migration of liquids, organisms, solids, and/or gas in the mass. In addition to the preferred use of gravity, the powered movements (10) of the elements of the mixture maximize exposure and treatment. The pump (10) in the reservoir moves liquids and organisms back to the materials through assorted conduits (2, 6). A waste pile (1) that is being used to grow organism while digesting solids (1) and cleaning liquids can also be utilized to mix and dilute materials (1) that would be too toxic to treat otherwise. The vacuum extraction (10) of liquid and organisms from the material mass (1) is an important feature of this invention. The conventional internal drainage of the organic materials should be modified to minimize the filtering of the organisms. Extraction media can be any porous media within the pile (2) but will be referred to as piping (2) from this point on. The piping should be sealed from outside atmosphere such the internal flow of liquid or gas (oxygen, methane, etc.) and the extraction of organism can be maximized. Energy efficient siphon (10) arrangements can be achieved if sufficient elevation change is available. The use of Transformer technology in combination with anaerobic degradation is beneficial. The clogging associated with anaerobic digestion can be overcome in the input lines and media with forced (10) aerobic liquids used for cleaning. The use of aerobic liquid in the organic materials is a form of the Transformer process. Cleaning, flushing, and purging with aerobic liquid is an improvement of that invention and is a form of this invention. Wells and excavations (2) into areas of optimized biological activity facilitate the extraction and reintroduction of optimized organisms. Flow of liquids, gas, organisms, nutrients, and contaminants is utilized to create treatment opportunities that are not available in any other circumstance. Sealed vertical (3) sumps (2) can be produced by drilling, digging, or burying as waste is placed. The targeted removed solid is teeming with biological activity. Leaving sealed (3) sumps (6) as the material (1) is placed is a likely a best mode application. A perforated pipe (2 or 6 or both) buried horizontally, is a good opportunity to extract bacteria that can be utilized to improve the breeding stock or the several other options this invention provides. Pumps or vacuum (10) connections in sumps can quickly remove bacteria and liquid and transport them to whatever area is most advantageous. The removal of the liquid (1) accelerates the flow within the containment (4, 5) and improves treatment capabilities.

FIG. 11 Illustrated flow induction and the use of channels to accelerated the migration of liquids, organisms, solids, and/or gas in the mass. Isolation of anaerobic and aerobic liquid, solids or combinations facilitate treatment of difficult materials.

FIG. 11 Detail

Sequential anaerobic and aerobic processing of solids, liquids, gasses, and contaminants.

1 anaerobic or aerobic material: solids, gasses and liquids;
2 Injection, transmission, and/or extraction points, consisting of drainage media, channels, or piping, vertical, horizontal, or angled;
  for liquids, gasses, slurries, solids (injection, pressurization, siphoning);
  for vacuum extraction, gravity extraction, or pressure relief of liquids, gasses, slurries, within the mass or liquids or both;
3 seals (multiple) liquids or gas or both—optional with aerobic or when redundant;
4 covers—impermeable or not, optional with aerobic treatment;
5 liners—impermeable as required—plastic, metal, masonry, composites, etc, or any other materials or mixture of materials;
6 open channels that facilitate flow—optional or in lieu of drainage media, channels, or piping;
7 ballast for seal or barrier;
8 Compost and other biologically active filter media—optional for processing emissions;
9 monitoring pts, multiple locations;
10 pumps, suction lines, vacuum ports, blowers, siphons, and/or the end of a positive or negatively pressurized line-optional with performance requirements;

Forced flow (10) and the use of open channels and piping (2, 6) is utilized to accelerate the migration of liquids, organisms, solids, and/or gas (1) in the mass. Isolation of anaerobic and aerobic liquid, solids or combinations facilitate treatment of difficult materials in both the liquids and the solids. Both gravity and powered materials movement can be utilized for biological, solid, gas, and liquid materials movement.

A typical application is one or more landfills (or any other organic materials) being treated with aerated liquid as described by the Transformer process. Powered extraction and forced flow are innovations of this invention that produces an array of opportunities. One or more liquid containment vessels are utilized to enhance biological activity and facilitate the reintroduction of the enhanced liquid and bacteria.

Organisms are extracted, manipulated, and utilized in one of more locations, characterizing a major improvement of existing technology. Movement of the organism is critical to effectiveness; dead organisms are of little value. The anaerobic portion of the invention provides a synergistic improvement in overall treatment capability, producing more degradation in toxic material, in less time. Treatment capabilities are expanded exponentially; environmental protection and remediation capabilities of our civilization are significantly expanded.

1. An emission capture and treatment system that contains any combination of headers, laterals, chimneys, vaults, blowers, vacuum pumps, and plenums. Combining some or all the components with impermeable and permeable masses of composted material and impermeable membranes makes an effective greenhouse gas collection and consumption system. These features facilitate the collection and treatment of emissions from partially treated and untreated materials. The invention feature greatly reduce emissions from both anaerobic and aerobic (conventional composting or Transformer) facilities. These control features facilitate the accurate measurement and verification of destruction of emissions. Final release of treated gas is controlled, isolated, and easy to test. Accurate measurement of emissions destruction provides the opportunity for emission credits.

The construction of piles of organic materials that are designed for open channel flow, superior drainage, and optimized internal flow facilitates cost effective and efficient processing. Aerated or anaerobic liquid are injected into the targeted material and flow distributes the organisms. Anaerobic treatment in best mode requires a cover to isolate the system from the atmosphere and facilitate the harvesting of the methane. Pressurizing the containment also increases flow and therefore biological activity.

A partially or completely covered mass of organic materials that has minimized emissions, controlled inputs, and maximized operational flexibility will be produced. ACCELERATED PROCESSING features containment and control of emissions with minimized use of compost and easy emission treatment. The invention can also be utilized to increase treatment efficiency at bioreactor facilities, standard landfills, or an unlined wastemass. The ACCELERATED PROCESSING containment can be substituted for a conventional cap on the old city dump. The invention can be utilized in any application that requires control of gas emissions and liquid flows. Emission treatment, biological digestion, and synergistic decomposition of persistent contaminants are some of the resultant benefits.

The movement of gasses can be facilitated by pumping, gas density, or thermal convection. The simplicity of the system means low costs and applications in remote settings.

Facilities utilizing this technology have the following characteristics:
- improved containment and treatment of liquids and gasses;
- very low costs, minimal energy use, and excellent application to remote sites;
- actual site remediation for the same cost as capping;
- high efficiency treatment media—digested organics.

2. The capability to produce beneficial mixture of liquid, bacteria, and nutrients through the manipulation and modification of aerobic and anaerobic environments is an important attribute of ACCELERATED PROCESSING. The volume of solids and liquids that can be used for the various treatments is not limited. The larger the facility, the greater the diversity and opportunity for optimized treatment results. An ACCELERATED PROCESSING facility can be set up on a contaminated site for the purpose of processing waste and remediation of the site. Treatment can be ex situ, in situ, or both. The combination of solid and liquid containment makes it possible to control the process and therefore the results of the process. Addition of non-waste materials such as lime or other modifiers is available to mimic or change the characteristics of the treatment material or the site that will be treated. The use of the organic materials and the liquid containment to adjust pH, stabilize metals, and other treatments of undesirable and toxic characteristics can be accomplished by the invention. Processing large quantities of acid mine drainage liquid or in-situ treatment of a mine site is a practical application of the invention. The injection of anaerobic or aerated liquid into the organic materials and the processing of liquids in the containment facilitate the formation of beneficial microbial mixtures that can be utilized as nutrients and fertilizers. Growth of beneficial organisms is accomplished in both the liquid and solid material.

Transformer facilities clean liquids and aerobically digest solids. This invention takes the process further and furnishes larger quantities of beneficial bacteria, in addition to nutrients, for transfer to other facilities in both the liquid and solid form. In order to function with maximum benefits the aerobic and anaerobic bacteria must be maintained until they are applied to the recipient site. Dead bacteria are of minimal value. Addition of oxygen, food, and/or refrigeration may be required to maintain the organisms. The stabilized nutrients of the ACCELERATED PROCESSING system are available for utilization by the recipient site. Liquid circulation of the Transformer process is enhanced through the organics to produce beneficial mixtures.

Addition of large organic contributors such as manure, greenwaste, sewage, sludge, and foodwaste can be utilized to optimize the soil enhancement value of the resultant solids and liquids. The solid and liquid treatment furnished by the invention offer many advantages over the existing systems. Nutrients are stabilized or preserved in forms that are available to recipient plants. High strength wastes, such as manure or sludge are buffered, but much of the nutrients the materials originally contain are preserved. Odors, undesirable plant and insect reproductive media, and pathogens can be destroyed or minimized. Chemical and pH adjustment with additives from industrial or agricultural waste can enhance the value of both liquids and solids. Materials that are not waste such as sugars, lime, acid, or oils can also be utilized to manipulate biological results. The end products of ACCELERATED PROCESSING can be tailored to the needs of the recipient site. The volume available for mixing and buffering is a major advantage when comparing this invention with existing systems.

Facilities utilizing this invention feature liquids and solids that can be utilized for pH control used for acid materials treatment (such as mine waste) and metal stabilization. Beneficial materials are furnished that supply micronutrients, nitrogen, phosphorus, metals, and/or beneficial bacteria. Bacteria furnish disease resistance/inoculants, insect control, antifungal characteristics, and general pathogen control.

3. Treatment of resistant contaminants such as chlorinated solvents and pesticides through sequential exposure to aerobic and anaerobic environments is a feature of this processing system. Increased remediation capability through the combination of aerobic and anaerobic exposures significantly increases the effectiveness of the treatment. The system mixes and selects bacteria to achieve an optimum group of organisms. The optimum mix of the various types of bacteria available to the facility can be manipulated and manufactured for the purpose of material stabilization or remediation. Mixing bacteria from multiple sites, or multiple extraction points within individual waste piles or landfills can be utilized. Mixing and dilution of contaminated materials reduces toxicity such that toxins can be biologically reduced to nontoxic components. Isolating optimized bacteria and contaminants results in a decontaminated material because the bacteria are forced to consume even the most resistant and toxic contaminants. The timely removal and use of the acclimated bacteria is a feature of this invention. Reintroduction of the bacteria with the optimized ability to degrade toxins and waste leads to further enhancement of the process capabilities. Combining multiple sites leads to additional capabilities.

The combination of anaerobic and aerobic treatment has benefits to the anaerobic solids portion of the system. The sequential cleaning of liquid distribution components of the anaerobic system with aerated liquid will maximize the efficiency of the distribution system. Digestion of anaerobic sludge and precipitates improves the liquid distribution of the anaerobic organic materials and liquid storage vessels. Anaerobic liquid extraction apparatus can be cleaned and revitalized. Utilization of the treated aerated liquid reduces or eliminates emissions from the uncapped areas and liquid collection systems of the non-aerobic site. The utilization of the aerobic treatment on anaerobic organic materials that is no longer an effective gas producer minimizes environmental liability and prepares the facility for alternative uses. Use of the ACCELERATED PROCESSING process enhances the capabilities and value of anaerobic systems.

Wastepiles and liquid storage vessels will be utilized to reduce toxicity and facilitate the treatment of contaminated materials. Multiple wastepiles unlimited distances apart or waste masses that contain both anaerobic and aerobic zones are utilized to optimize treatment of both liquids and solids. Materials are treated in combinations of solid, liquid, anaerobic, and aerobic environments. The transfer between the various media is simple and effective and can be combined with other auxiliary treatment components to manipulate results. The use of filtration such as reverse osmosis nanofiltration can be used to concentrate bacteria for transfer to a treatment site for remediation or beneficial application to plants. Removal of specialized treatment organisms that will be used on persistent contaminants can drastically increase the speed of the next treatment. The use of the auxiliary treatment components can speed the discharge of liquids to surface or groundwater. Liquid containment is a very effective tool to change between the environments because it is simple to manipulate oxygen content.

Chlorinated contamination can be treated anaerobically first, then aerobically, then back to anaerobically. The sequence can start and end in either environment and in either media. The invention offers large advantages over existing methods because of enhanced control and flexibility. The system is adjusted to suit the large number of variables that are inherent to contamination treatment. Waste strength, ambient temperature, and available equipment are significant variables and controls that the invention includes. Placing an ACCELERATED PROCESSING site in a brownfield site to treat both surface and water contamination is an excellent utilization of the invention.

Starvation treatment is an important aspect of the invention. Developing a thriving biological treatment is critical capability of the invention; starvation treatment is the ultimate utilization of the bacteria. The most persistent contaminants will require the media to be isolated while containing the contamination and an organism that is capable of complete or partial degradation of the targeted contaminant. The most toxic of materials are consumed when no other energy source is available. The treatment organism reduces the contamination because there is no alternative energy supply. Biological selection controlled by the invention furnishes the organisms. Control, in the form mixing, transfers, and breeding in the liquid and solid environments in conjunction with multi-site transportation furnishes optimum treatment. With particularly difficult contamination, multiple starvation treatments may be required to address toxic daughter compounds. A reduced contaminant may still be unacceptable for release into the environment. Material containment or isolation vessels can be sealed completely from the outside environment with liners and covers to improve performance. The invention furnishes the control required for a quantum leap forward in treatment. Use of small doses chemical compounds, nutrients, and or organisms to address plumes in groundwater is overshadowed by the massive remediation power and volume that is being made available.

Seeding of a liquid or solid treatment area with the appropriate daughter contaminants can furnish optimum bacteria at the optimum moment. Liquids or solids that have been processed by bacteria that have been driven to brink of starvation are exceptionally effective at degrading the next dose of contaminant in the same isolation. Manipulation of the treatment characteristics of the ACCELERATED PROCESSING facility to match the characteristics of remote contaminated sites that requires treatment is a unique aspect of this inventive system. The manipulation of oxygen within the liquid or solid bacteria breeding ground is a simple illustration of the many factors that can be controlled and utilized by this invention.

For energy recovery an anaerobic treatment containment is formed with impermeable membranes and a gas extraction which the materials to be digested are added. The vessel contains liquid extraction media that are isolated from oxygen unless sequential treatment is required. The media is utilized to induce flow, extract liquid, and influence the migration of gas. Injected liquids, nutrients, gas, solids, and/or organisms influence the migration and/or production of gas. The slopes of the material are low and the containment berms are built to deal with plastic movement of the degrading material. New material is added to one end of the containment as gas is extracted from beneath the membrane at the other end of the anaerobic area. After gas production is no longer desired, the material is digested aerobically, utilizing the existing media and ACCELERATED PROCESSING technology. During initial filling or after gas extraction is complete; the ACCELERATED PROCESSING emission cover seals in, collects, or oxidizes emissions. During gas harvesting the cover collects gas and the extraction channels are used as gas collection vessels. Vacuum points within the solids control or influence flow of liquids, organisms, and gas. Aerobic treatment in the channels will eliminate emissions after gas production is terminated. Channels can be used for distribution of aerobic liquid into the solids. Vacuum points within the solids control or influence flow of liquids, organisms, and gas. Channels and liquid distribution system is used to incorporate organisms. After digested waste removal is complete, the cycle can be restarted.

Facilities utilizing this invention feature sequential treatment consisting of combinations of;
- anaerobic to aerobic or aerobic to anaerobic exposures in multiples;
- injection anaerobic or aerobic liquid, gas, or solid into targeted materials. Isolation and movement—treatment and optimizing organisms by contamination addition;
- so in the isolation treatment portion of the invention, just before the organisms starve to death, the organisms commonly achieve a numerical peak and are highly effective;
- with addition from destinations added to acclimate the organism;
- with isolation for forced to consumption and organism selection of even the highly persistent or toxic materials such as drugs, pesticides, or hormones;
- from other sites, extracted organisms, daughter products and the associated reducing organisms, or similar contaminants are utilized for seeding;
- at that time of maximum population, the organisms can be transferred off site or to another area within the current site;
- for transfer to a remote site with biologically adapted organisms drastically reduces treatment time and increases the intensity of treatment;
- as pH and other modifiers are utilized to facilitate acclamation and optimize treatment;
- with extremes of environment and toxins to kill all but optimum characteristics;
- allow optimized organisms are forced to proliferate in preparation of utilization.

Mixing—solids and or liquids for acclamation and optimum organisms furnishes;
- organisms that are the strongest and most suitable for digestion of materials;
- mixtures to acclimate organisms both to optimum treatment environments and to the remote environments that the organisms will be utilized in;
- exposure to conditions of destination and a massive number of the organisms.

Mixing—toxicity reduction furnishes;
- lower concentrations of contamination facilitates the reduction/digestion of the toxin;
- in the diluted, contaminated environment, organisms are furnished with an opportunity to adapt that is not available at high concentrations of the toxic material;
- a graduated increase in contamination, furnished by the invention, produces an organism that is adapted to treatment conditions of a remote location;
- the massive influx of acclimated organisms causes successfully remediation;
- the retention time and the intensity of treatment offer the opportunity to treat persistent chemicals and synthetic compound such as drugs and hormones;
- with gradual addition of contamination, a refined and specialized treatment population is maintained at optimum levels;
- a continuous flow scenario of addition and removal that will maximize the quantity of contamination treated.

4. The liquid drainage features of the Transformer treatment system are exploited to extract, transfer, and maintain live bacteria. The use of pumps, vacuum, excavation, and enhanced gravity extraction are attributes of this invention. Pulling liquid, gas, organisms, and/or oxygen through the aerobic solid portion of the system significantly increases bacteria populations and bacterial vitality. The siphoning of oxygen into the organic materials improves the biological conditions within the organic materials. Rapid throughput of oxygenated liquids increases the area of treatment and reduces the likelihood of greenhouse gas production. The accelerated transfer of aerated liquids or spent liquid through the organic materials improves the speed and effectiveness of aerobic digestion utilizing dissolved oxygen.

Pulling liquid, gas, and/or organisms, through anaerobic solids will increase the throughput and therefore the treatment capacity of the system. The rapid movement of liquid, gas, and/or organisms through the organic materials and the associated distribution of anaerobic bacteria increases biological activity. Current digestion systems require pulping or mixing to treat mixtures up to 15% solids. The invention minimizes processing and treats solids at above 15%, maximizes capacity, and minimizes costs.

Increased anaerobic biological activity increases maximum gas production and overall gas production while reducing the length of time that gas production occurs. Increased exposure of toxins such as chlorinated solvents facilitates the accelerated and improved degradation of material. Mixing in the liquid containment and the organic materials turns the two components into an efficient anaerobic processing unit with very large and cost effective treatment capabilities. The use of vacuum liquid extraction and pumping in addition to supplemental drainage increases the liquid throughput and liquid storage recharge. The treatment capability of the facility, both processing the organic materials and processing the contaminants in the liquid is dependent on liquid throughput.

Live bacteria rapid extraction from the solid organic materials and the liquid storage/treatment vessels of the invention furnish the opportunity to produce generations of increasingly acclimated organisms to be utilized for in situ treatment at other sites or other areas of the current site. Bacteria evolve on an exponential scale. Treatment speed, diversity with specialized contaminants, and accelerated ability to adapt are all features of the invention. When in transition between contamination sources, the minimization of variables increases the speed of acclamation in individual treatment areas.

The Transformer process includes the augmented removal of liquids from the organic materials to decrease hydraulic cycle times, biological cycle times, increase biological populations, and improve control of the process. ACCELERATED PROCESSING takes the process further by redesigning liquid collection system in organic materials for the transfer of live organisms. A coarse filter/strainer system at various levels in the waste mass facilitates the removal of an optimum volume of live organisms. Sand, permeable membranes, or/and geotextiles that impede the movement of organisms will be avoided. Design with emphasis on open channel flow is used. Pumping of liquid and live organisms from the interior of the organic materials (wherever the biological populations are optimum), is an aspect of the invention that increases the transfer of biological populations and treatment capability. These aspects of the invention also improve the movement of liquids and oxygen through the waste. The combination of pressure, vacuum, and open channel flow maximize treatment.

The use of suction of any manner to remove liquids from the waste mass is a version of the invention. Suction can be produced by pumping of liquid, siphoning, introduction of vacuum, or any other process that increases flow. The suction of contaminated liquids through anaerobic organic materials increases the treatment efficiency of the anaerobic zone. Difficult to treat materials such as chlorinated materials are exposed and treated more effectively by this process. The use of gravity to induce suction on an internal drainage line is an opportunity to extract internal bacteria without an external energy source. Sequential aerobic/anaerobic treatment can be utilized to manipulate pH and optimize gas production.

Facilities utilizing this invention feature:
Anaerobic treatment of high solids materials;
Rapid movement of bacteria and increases in treatment capability;
Reduced greenhouse gas production in aerobic organic materials;
Reduced greenhouse gas releases and energy recovery by anaerobic containment;
Increased opportunity for from the aerobic organic materials;
Increased quality and volume of gas recovery from the anaerobic organic materials;
Rapid treatment and movement of contamination;
Rapid increase of hydraulic "cycle" speed and movement of oxygen and/or organisms;
Rapid increase in biological exposure and biological vitality;
Expanded range of organisms that can survive in the solid and liquid treatment areas;
Facilitation of the transfer of organisms into other treatment sites;
Isolation of anaerobic and aerobic zones of the organic materials to facilitates combined treatment.

5. A feature of the invention is the ability to produce of large quantities of treatment bacteria that can be injected in situ or ex situ to degrade the contamination of soils and groundwater. The extraction of live bacteria from the organic materials facilitates the acclamation of the bacteria to the waste materials present. The addition of large amounts bacteria into contaminated materials outside of the systems containment facilitates in situ treatment. The original contamination that the bacterium was developed with can be at below detectable levels, below cleanup criteria, or above cleanup criteria when it is added. The characteristic of the injected mixture will be adjusted to optimize the effects of the in situ treatment.

The mixing of multiple sites and multiple areas within sites will facilitate the refinement and effectiveness of the degrading organisms. Exponential reproduction is manipulated by furnishing all components needed for the bacteria to thrive. The massive biological population can be used as a tool to process, isolated, or control contaminants in both in situ and ex situ applications.

Ex-situ anaerobic treatment in zones or organic materials of an ACCELERATED PROCESSING facility furnishes an amazing flexibility of treatment. The ACCELERATED PROCESSING facility develops synergistic efficiency when the optimized treatments are combined. Because of the invention's ability to produce larger quantities of beneficial bacteria then any other process, the ability to treat both in situ and ex situ is significantly improved. The production capability permits in situ treatment of contamination sources and contamination plumes plus control of migration of the plume.

Permeable barriers of digested solids, produced from organic materials, make a superior control or treatment device on anaerobic materials.

The transfer of ACCELERATED PROCESSING liquids to an area of contamination is an important part of this invention. The transferred liquid can contain contamination above, below, or at the cleanup target for the destination site. Site specific regulation, costs, and the needs of the biologic treatment organisms will dictate the characteristics of the transferred liquids.

Facilities utilizing this invention feature production of large quantities of organisms:
available for in situ or ex situ treatment;
available to contain a contamination plume;
available to treat a contamination plume;
available to treat a contamination source;
adjusted to destination characteristics;
in liquids or solids from the original ACCELERATED PROCESSING waste, the destination site, or from contaminant seeding containing contamination below detection, below cleanup criteria, or above cleanup criteria;
large quantities of organisms grown in both or either solid and liquid containment.

6. When a material has been partially digested, the addition of worms, insects, and plants, in addition to bacteria and fungi nurtured by the Transformer process, can be utilized to increase the value of the treated materials, reduce costs, and improve treatment efficiency.

The aerobic digestion of organic material significantly influences the toxicity of materials. Pretreatment of organic materials with aerobic or a combination of aerobic and anaerobic bacteria, expands the opportunity for treatment by higher-level organisms. The effectiveness and speed at which biological treatment by higher organism can take place is enhanced by ACCELERATED PROCESSING. The use of the higher-level digesters after ACCELERATED PROCESSING or Transformer treatment is part of this invention.

Facilities utilizing this invention feature:
Worms, insects and greater range of bacteria working in the treated waste;
Increase quality of product after digestion;
Matching of treatment to the level of digestion and waste toxicity on an individual basis.

7. Energy produced from the gas of the anaerobic waste mass and liquid storage vessel is a valuable resource. Gas production the treatment system can be arranged to extract gas from the anaerobic organic materials that is utilized to heat and power the rest of the system. High energy waste that degrades quickly can be processed anaerobically for gas extraction, aerobically degraded for volume reduction and sterilization, and then be used as fertilizer or as an emission oxidizing cover. Additional methogenic organisms produce additional gas when circulated in the organic materials or in the liquid containment. The rapid transfer of liquid facilitates the extraction of heat from the liquid for beneficial purposes. Additional aerobic organisms produce additional heat and additional digestion when circulated in the organic materials or in the liquid containment.

Summation of Prior Art

The Transformer Process was a milestone in treatment technology. It utilizes liquid and dissolved oxygen to facilitate the controlled decomposition of organic materials in a waste mass. This invention is the optimization and control of the processing of organic materials, mixtures that contain organic materials or the processing of degradable material in soils, structures, equipment or other objects. PreTransformer system do not effectively manipulate organisms, strategically induce flow of liquids, and transfer of liquids. Prior art concentrates the simple addition of liquids, addition of bacteria, and injection of gas. Prior art fails to see the inventive step of the development of the internal biological identity and the benefits of cycling the liquids in and out of the materials. The failure of the prior references to effectively teach and practice the biodegradation of contaminated soils and/or ground water is due to the failure to utilize oxygenated liquids. Since the use of oxygen-enriched liquids would limit the amount of oxygen introduced into the mass of solid waste when compared to aeration of the mass of solid waste with a gas stream containing oxygen, therefore the use of oxygenated liquids and multiple cycles was not obvious and was not taught. Adding gas to the material does not effectively bring oxygen to the biological process. Prior art teaches a static system that is not effective at increasing the processing capabilities of the microorganisms. The utilization of organisms developed in the "system" was never taught or fairly suggested in prior art.

I claim:

1. A method of biological treatment of piles of solid waste materials, containing some organic matter, and any liquids or slurries added to the piles, comprising:
    providing a lined liquid retaining structure having powered liquid or powered gas or both powered liquid and power gas injection system or systems, powered liquid or powered gas or both powered liquid and powered gas extraction system or systems or any combination of powered injection or extraction system that control any or all of temperature, gas and liquid flow, or oxygen content within the liquid retaining structure with liquid;
    inserting into the liquid retaining structure a pile of solid waste materials to be processed and removing said solid waste materials after complete processing or at intermediate stages;
    using the liquid retaining structure having at least one powered injection or extraction system;
    using the liquid retaining structure having of a liquid, or gas, or liquid and gas injection system or systems, and a liquid, or gas, or liquid and gas extraction system or systems, or only a powered injection or extraction system, to force liquids, gas, or both to flow through the contained pile, to treat the materials in the retaining structure, and increase microorganism populations and evolution of microorganism populations within the solid waste materials or liquids involved;
    removal and reintroduction of liquid, gas, or solids, to and from the pile of solids in the liquid retaining structure, such that the microorganism population, in the pile of solids in the liquid retaining structure, is maintained or manipulated as liquid moves through the solid waste materials in the liquid retaining structure or both;
    removal and reintroduction as many times as needed, extracted or new, liquid, gas, or solids into or out of the liquid retaining structure to manipulate microorganism populations or the evolution of those microorganism populations within the solid waste materials or otherwise modify treatment within the liquid retaining structure; and
    forcing gas or liquids or both, into or out of the pile of solid waste materials with any combination of the injection or extraction system(s) with sufficient force to overcome whatever resistance exists to the flow through the solid waste materials or to selectively distribute microorganisms, distribute nutrients and transmit heat.

2. The method of claim 1, wherein the microorganisms are aerobic microorganisms and the liquid retaining structure has no cover and encloses only the bottom and sides of the pile of materials.

3. The method of claim 1, wherein the microorganisms are anaerobic microorganisms and the liquid retaining structure has a cover.

4. A method of production of beneficial microorganisms in piles of solid waste materials, containing some organic matter, and any liquids or slurries added to the piles, comprising:
    providing a lined liquid retaining structure having powered liquid or powered gas or both powered liquid and power gas injection system or systems, powered liquid or powered gas or both powered liquid and powered gas extraction system or systems or any combination of powered injection or extraction system that control any or all of temperature, gas and liquid flow, or oxygen content within the liquid retaining structure with liquid;
    inserting into the liquid retaining structure a pile of solid waste materials to be processed and removing said solid waste materials after complete processing or at intermediate stages;
    using the liquid retaining structure having at least one powered injection or extraction system;
    using the liquid retaining structure having of a liquid, or gas, or liquid and gas injection system or systems, and a liquid, or gas, or liquid and gas extraction system or systems, or only a powered injection or extraction system, to force liquids, gas, or both to flow through the contained pile, to treat the materials in the retaining structure, and increase microorganism populations and evolution of microorganism populations within the solid waste materials or liquids involved;
    removal and reintroduction of liquid, gas, or solids, to and from the pile of solids in the liquid retaining structure, such that the microorganism population, in the pile of solids in the liquid retaining structure, is maintained or manipulated as liquid moves through the solid waste materials in the liquid retaining structure or both;
    removal and reintroduction as many times as needed, extracted or new, liquid, gas, or solids into or out of the liquid retaining structure to manipulate microorganism populations or the evolution of those microorganism populations within the solid waste materials or otherwise modify treatment within the liquid retaining structure;
    forcing gas or liquids or both into or out of the pile of solid waste materials with any combination of the injection or extraction system(s) to force liquid or gas or both to flow through the solid waste materials or to selectively distribute microorganisms, distribute nutrients and transmit heat;
    the use of or modification of liquid, gas, or solids from the liquid retaining structure, outside the liquid retaining structure, for isolated treatment or reintroduction into liquid retaining structure to modify biological treatment within the solid waste materials or for use at other sites, containments, or applications;
    forcing gas or liquids into or out of the pile of solid waste materials with any combination of the injection or extraction systems to force liquid or gas or both to flow through the solid waste materials in the liquid retaining structure; and adding liquid, gas, or solids to the solid waste materials in the liquid retaining structure to treat the liquid or solid or improve the biological treatment within.

5. The method of claim 4, wherein a liquid, solid, or gas is moved in or out of the pile of solid waste materials from or to any other containments, to increase or improve the biological treatment within the pile of solid waste materials or any other containment.

6. The method of claim 4, wherein a liquid, solid, or gas is moved in or out of the pile of solid waste materials to any other materials, to increase or improve the biological treatment within any other materials or other beneficial applications of the extracted liquid, solid, or gas.

7. The method of claim 4, wherein the microorganisms are aerobic microorganisms and the liquid retaining structure has no cover and encloses only the bottom and sides of the pile of materials.

8. The method of claim 4, wherein the microorganisms are anaerobic microorganisms and the liquid retaining structure has a cover.

\* \* \* \* \*